United States Patent
Nagasawa et al.

(10) Patent No.: US 8,665,824 B2
(45) Date of Patent: Mar. 4, 2014

(54) WIRELESS COMMUNICATION APPARATUS

(75) Inventors: Chizuko Nagasawa, Yokohama (JP); Kugo Morita, Yokohama (JP)

(73) Assignee: Kyocera Corporation, Kyoto-Shi, Kyoto (JP)

(*) Notice: Subject to any disclaimer, the term of this patent is extended or adjusted under 35 U.S.C. 154(b) by 637 days.

(21) Appl. No.: 12/934,593

(22) PCT Filed: Mar. 26, 2009

(86) PCT No.: PCT/JP2009/056177
§ 371 (c)(1),
(2), (4) Date: Sep. 24, 2010

(87) PCT Pub. No.: WO2009/119764
PCT Pub. Date: Oct. 1, 2009

(65) Prior Publication Data
US 2011/0019580 A1 Jan. 27, 2011

(30) Foreign Application Priority Data
Mar. 27, 2008 (JP) ................................. 2008-084097

(51) Int. Cl.
*H04W 4/00* (2009.01)
(52) U.S. Cl.
USPC ............................ 370/331; 370/428; 370/235
(58) Field of Classification Search
USPC ......... 370/310–350, 516, 230, 235, 352, 412, 370/428, 503; 709/232–235
See application file for complete search history.

(56) References Cited

U.S. PATENT DOCUMENTS

| 7,440,430 | B1* | 10/2008 | Jagadeesan et al. | 370/331 |
| 8,085,678 | B2 | 12/2011 | Spindola et al. | |
| 2004/0204945 | A1* | 10/2004 | Okuda et al. | 704/500 |
| 2005/0286466 | A1* | 12/2005 | Tagg et al. | 370/329 |
| 2006/0077994 | A1* | 4/2006 | Spindola et al. | 370/412 |
| 2006/0153163 | A1* | 7/2006 | James | 370/352 |
| 2006/0251130 | A1* | 11/2006 | Greer et al. | 370/508 |

(Continued)

FOREIGN PATENT DOCUMENTS

| JP | 2006-050488 A | 2/2006 |
| JP | 2006-238445 | 9/2006 |
| JP | 2007-214985 A | 8/2007 |

(Continued)

OTHER PUBLICATIONS 10-2010-7021387, Dec. 23, 2011, Korean Office Action and English Translation.

*Primary Examiner* — Andrew Chriss
*Assistant Examiner* — Kenan Cehic
(74) *Attorney, Agent, or Firm* — Workman Nydegger

(57) ABSTRACT

A reproduction speed of an application being executed is controlled with changing an upper limit of accumulation of a jitter buffer based on a radio state during communication by a first wireless communication network. If it is determined to start handover preparation from the first wireless communication network to a second wireless communication network, a preparation time before handover and an absolute delay time of each of the first wireless communication network and the second wireless communication network are obtained from the handover control unit. Based on such information obtained and a data amount in a jitter buffer at a time when it is determined to start the handover preparation, the reproduction speed of the application being executed is controlled to be slowed down. Thereby, it is possible to perform handover to a different wireless communication network without deteriorating reproduction quality and real-time property.

10 Claims, 15 Drawing Sheets

(56) References Cited

U.S. PATENT DOCUMENTS

2010/0290454 A1* 11/2010 Lundberg ............... 370/352
2011/0019580 A1* 1/2011 Nagasawa et al. ........... 370/252
2011/0222423 A1 9/2011 Spindola et al.
2012/0288074 A1* 11/2012 Katis et al. ............... 379/93.01

FOREIGN PATENT DOCUMENTS

| JP | 2008-005392 A | 1/2008 |
| KR | 20060128103 | 12/2006 |
| KR | 20070064673 | 6/2007 |
| WO | 2006/044696 A1 | 4/2006 |

* cited by examiner

FIG. 3
(a)
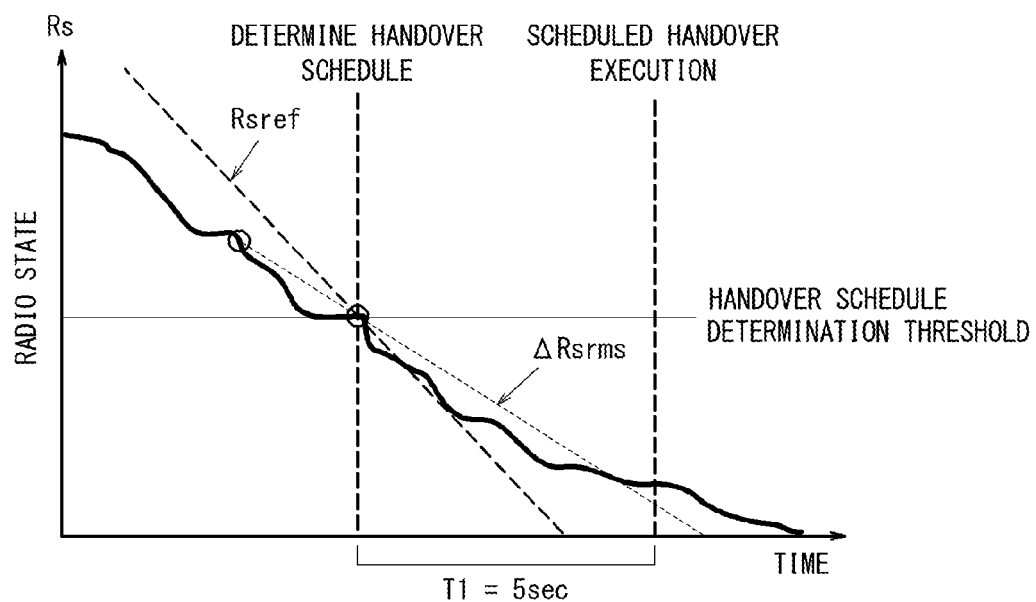
(b)
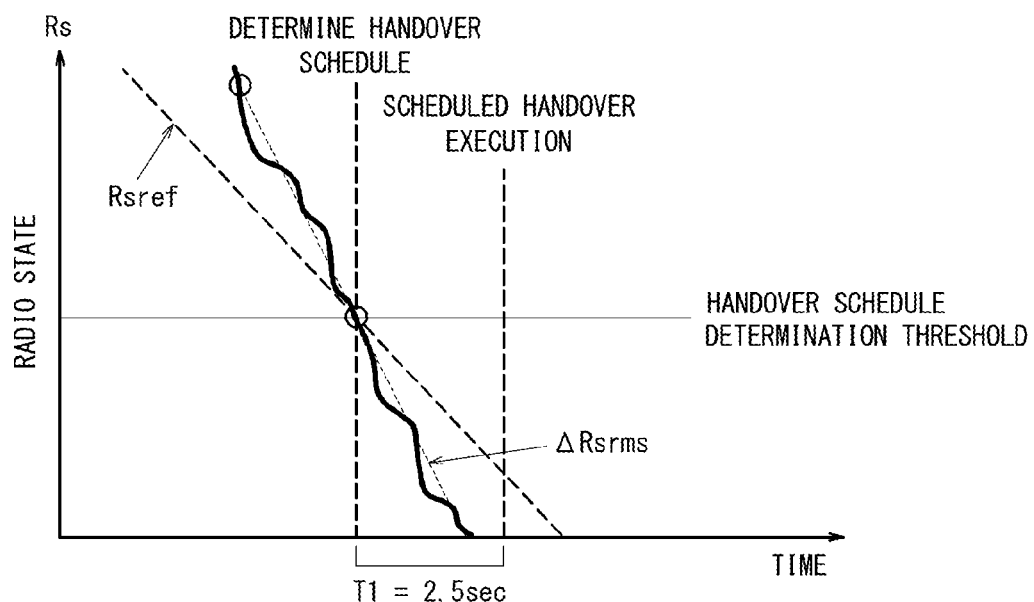

WIRELESS COMMUNICATION APPARATUS

CROSS REFERENCE TO RELATED APPLICATION

This application claims priority to and the benefit of Japanese Patent Application No. 2008-84097 filed on Mar. 27, 2008, the entire contents of which are incorporated herein by reference.

TECHNICAL FIELD

The present invention relates to wireless communication apparatuses capable of performing handover between different wireless communication networks.

BACKGROUND ART

In recent years, IETF (Internet Engineering Task Force) has been considering an IP mobility scheme for seamless movement, which enables handover between a plurality of different wireless communication networks such as a cellular phone network, a wireless LAN and the like, in order to achieve ubiquitous environment. As a specific protocol of the IP mobility scheme, there are Mobile IPv4 and Mobile IPv6 (which are abbreviated as Mobile IP, hereinafter) for supporting movements of each individual communication terminal, and NEMO (Network Mobility) for supporting mobility of a network as a unit.

Incidentally, when an application such as VoIP having a real-time property is executed via the wireless communication network, an allowable bandwidth of a wireless communication path changes depending on a propagation environment such as fading, and arrival intervals of packets received by the communication terminal are changed in accordance with a change of the allowable bandwidth.

For this reason, it is generally performed to provide the communication terminal with a jitter buffer so as to first store received packets in the jitter buffer and then read out the packets from the jitter buffer and reproduce the packets at intervals based on the application. Thereby, it absorbs deviation in the packets, that is, displacement of reproduction intervals of packets caused by displacement of the arrival intervals (jitter) of the packets, so as to prevent deterioration of reproduction quality such as reproduced sound quality and the like. Moreover, when there is no packet in the jitter buffer since the jitter is large, and therefore silence occurs, or when too many packets are received in a short period to be stored in the jitter buffer, the communication terminal changes a reproduction speed, discards received packets, or changes a size of the jitter buffer.

On the other hand, a downlink absolute delay time of a packet received by the communication terminal, that is, a time (delay time) required for a packet transmitted from a counterpart communication terminal to be received via the wireless communication network varies depending on wireless communication networks. Thus, if the communication terminal is a wireless communication apparatus which is moving and performs handover to a different wireless communication network, and when the downlink absolute delay time of a handover destination is longer than that of a handover source, for example, it causes blank period not receiving a packet according to the a difference between the downlink absolute delay times.

In such a case, if the blank period not receiving the packet is longer than a time required to read out a last packet (that is, a jitter buffer standard delay time), received from the wireless communication network of the handover source, from the jitter buffer when packets are read out from the jitter buffer at certain intervals based on an application and reproduced at a certain reproduction speed, for example, there is no packet in the jitter buffer for a period of such exceeding time. As a result, since reproduction of packets is not performed at least during this period, it causes silence and deteriorates reproduction quality.

FIG. 12 shows diagrams for explaining a control method of the jitter buffer in the above case. In FIG. 12, (a) shows the number of packets received by the jitter buffer for a unit period, (b) shows the reproduction speed (read-out intervals) of packets from the jitter buffer, and (c) shows the number of packets in the jitter buffer. FIG. 13 shows flows of the packets in that case. In FIG. 13, "Transmission", "Reception" and "Reproduction" represent a transmission timing of a packet by the counterpart communication terminal, a reception timing of the packet received by the jitter buffer of the wireless communication apparatus, and a reproduction timing of the packet (timing to read out the packet from the jitter buffer) by the wireless communication apparatus, respectively. Here, it is assumed that there is no deviation in received packets (displacement of arrival intervals) either at a wireless communication network A of the handover source and a wireless communication network B of the handover destination.

As obvious from FIG. 12 and FIG. 13, no packet is reproduced for a time $Tn=\{(TddnB-TddnA)-Ta\}$, if a downlink absolute delay time TddnB of the wireless communication network B of the handover destination is longer than a downlink absolute delay time TddnA of the wireless communication network A of the handover source and the difference (TddnB−TddnA) is longer than a jitter buffer standard delay time Ta, which is applied to received packets when there is a standard number of packets in the jitter buffer. In such a case, moreover, since packets are reproduced immediately after being received from the wireless communication network B of the handover destination, it is not possible to absorb jitter.

In order to improve such a defect at handover, there is suggested a method, for example, to monitor a reception condition of packets and, if packets are not received at standard reception intervals, to control reading out of the packets from the jitter buffer, that is, to control the reproduction speed of the packets (see Patent Document 1, for example).

FIG. 14 shows diagrams illustrating a control method of the jitter buffer disclosed in Patent Document 1. In FIG. 14, in the same manner as FIGS. 12(a) to (c), (a), (b) and (c) show the number of packets received by the jitter buffer in a unit time, the reproduction speed, and the number of packets in the jitter buffer, respectively. FIG. 15 shows flows of the packets in such a case.

As shown in FIG. 14 and FIG. 15, if packets cannot be received at previous reception intervals such as when handover is performed from the wireless communication network A with the downlink absolute delay time TddnA to the wireless communication network B with the downlink absolute delay time TddnB which is longer than TddnA, the reproduction speed of packets in the jitter buffer is gradually reduced in accordance with increase in the reception intervals. When the reception intervals return to normal intervals thereafter, the reproduction speed is controlled to gradually increase to the standard reproduction speed in accordance with the number of packets in the jitter buffer.

Patent Document 1: Japanese Patent Laid-Open No. 2006-238445

SUMMARY OF INVENTION

Technical Problem

However, the jitter buffer control method disclosed in Patent Document 1, controls only the reproduction speed of packets currently stored in the jitter buffer to be gradually reduced when the packets cannot be received at previous reception intervals. Therefore, it is concerned that, when the downlink absolute delay time TddnB of the handover destination is relatively long, the reproduction speed is slowed down too much, causing deterioration of the reproduction quality. Accordingly, for VoIP, for example, since the reproduction speed dramatically changes from an original voice speed, it significantly deteriorates quality of reproduced voice and makes hard for a user to hear.

Although FIG. 14 and FIG. 15 show an example of control when silence and the like caused by no packet in the jitter buffer does not occur, it is practically unknown how long the reception intervals of the packets will be. It is thus concerned that, depending on the jitter buffer standard delay time Ta or the downlink absolute delay time TddnB of the handover destination, the jitter buffer may become empty causing silence and the like.

Although the jitter buffer standard delay time Ta may be set to be longer so as to prevent silence, this causes delay in reproduction of packets from the counterpart communication terminal in VoIP, for example, which loses the real-time property.

In consideration of such problems, it is an object of the present invention to provide wireless communication apparatuses capable of performing handover to a different wireless communication network without deteriorating the reproduction quality and the real-time property.

Solution to Problem

In order to achieve the above object, a wireless communication apparatus according to a first aspect includes:

a wireless communication unit for performing wireless communication by connecting to a first wireless communication network and a second wireless communication network different from the first wireless communication network;

an execution unit having a jitter buffer and a jitter buffer monitoring unit for monitoring a data amount in the jitter buffer, and for executing an application for real-time communication via the wireless communication system;

a communication quality obtaining unit for obtaining communication quality of a wireless link in the first wireless communication network during execution of the application by connecting to the first wireless communication network;

a changing unit for changing an upper limit of accumulation of the jitter buffer based on the communication quality obtained by the communication quality obtaining unit;

a control unit for controlling a reproduction speed of the application by the execution unit based on a change in the upper limit of accumulation of the jitter buffer by the changing unit;

a determination unit for determining whether to start handover preparation from the first wireless communication network to the second wireless communication network based on the communication quality obtained by the communication quality obtaining unit;

an estimation unit, when the determination unit determines to start handover preparation during execution of the application, for estimating a handover preparation time before starting handover based on the communication quality obtained by the communication quality obtaining unit; and a measuring unit for measuring a delay time of each of the first wireless communication network and the second wireless communication network, wherein the control unit, if the determination unit determines to start handover preparation, controls the reproduction speed of the application by the execution unit to be slowed down based on the handover preparation time estimated by the estimation unit, the delay time of each of the first wireless communication network and the second wireless communication network measured by the measuring unit, and the data amount in the jitter buffer monitored by the jitter buffer monitoring unit at a time when the determination unit determines to start handover preparation.

A second aspect of the present invention is that, in the wireless communication apparatus according to the first aspect, the control unit compares the delay time of the first wireless communication network and the delay time of the second wireless communication network when the determination unit determines to start handover preparation and, if the delay time of the second wireless communication network is longer than the delay time of the first wireless communication network by a predetermined time or longer, slows down the reproduction speed of the application by the execution unit.

A third aspect of the present invention is that, in the wireless communication apparatus according to the second aspect, the control unit, if the determination unit determines to start handover preparation, slows down the reproduction speed of the application by the execution unit such that the data amount in the jitter buffer meets a predetermined amount corresponding to a standard reproduction speed of the application at a time to start receiving data from the second wireless communication network.

A fourth aspect of the present invention is that, in the wireless communication apparatus according to the third aspect, the control unit returns the reproduction speed of the application to the standard reproduction speed after completing handover to the second wireless communication network.

A fifth aspect of the present invention is that, in the wireless communication apparatus according to the first aspect, the changing unit has a plurality of different changing thresholds for changing the upper limit of accumulation of the jitter buffer and changes the upper limit of accumulation of the jitter buffer to be more increased as the communication quality from the communication quality obtaining unit becomes closer to a handover schedule determination threshold of the first wireless communication network by the determination unit, based on a comparison of the communication quality from the communication quality obtaining unit and the plurality of changing thresholds.

A sixth aspect of the present invention is that, in the wireless communication apparatus according to the fifth aspect, the control unit controls the reproduction speed of the application, based on a comparison of the upper limit of accumulation of the jitter buffer set by the changing unit and the data amount in the jitter buffer monitored by the jitter buffer monitoring unit, such that the reproduction speed of the application is set to be the standard reproduction speed if the data amount is equal to the upper limit of the accumulation, to be a first reproduction speed slower than the standard reproduction speed if the data amount is smaller than the upper limit of the accumulation, and to be a second reproduction speed faster than the standard reproduction speed if the data amount exceeds the upper limit of accumulation.

A seventh aspect of the present invention is that, in the wireless communication apparatus according to the sixth aspect, an increased speed amount of the second reproduction speed to the standard reproduction speed is smaller than a decreased speed amount of the first reproduction speed to the standard reproduction speed.

An eighth aspect of the present invention is that, in the wireless communication apparatus according to the fifth, sixth or seventh aspect, the changing unit has, for the same upper limit of accumulation of the jitter buffer, an increasing changing threshold to be applied if the communication quality from the communication quality obtaining unit is lower than the increasing changing threshold, and a decreasing changing threshold to be applied if the communication quality from the communication quality obtaining unit exceeds the decreasing changing threshold, wherein the decreasing changing threshold is lower than the increasing changing threshold.

Advantageous Effects on Invention

According to the wireless communication apparatus of the present invention, in order to perform handover from the first wireless communication network to the second wireless communication network, since the preparation time before handover and the delay time of each of the first wireless communication network and the second wireless communication network are obtained in advance, it is possible to know how long after determination to start handover preparation and for how long the packet will not arrive if, for example, the delay time of the second wireless communication network of a handover destination is longer than the delay time of the first wireless communication network of a handover source. Thereby, it is possible to control the reproduction speed to absorb a difference in the delay times between the first wireless communication network and the second wireless communication network taking a time, so as to reproduce packets received from the first wireless communication network of the handover source even in a period the packets will not arrive due to the handover. Moreover, communication quality of a wireless link in the first wireless communication network is obtained before determination to start handover preparation and, based on the communication quality, the upper limit of accumulation of the jitter buffer is changed and the reproduction speed of the application is controlled based on change in the upper limit of accumulation. Thereby, even if a time from determination to start handover before actual execution of handover is short, it is possible to reproduce at a speed close to the standard speed by reducing a difference from the standard reproduction speed. Accordingly, it is possible to perform handover from the first wireless communication network to the second wireless communication network without deteriorating reproduction quality and real-time property.

BRIEF DESCRIPTION OF DRAWINGS

FIG. 3 is diagrams illustrating methods to calculate a handover preparation time by a handover control unit shown in FIG. 2;

Figure 1:
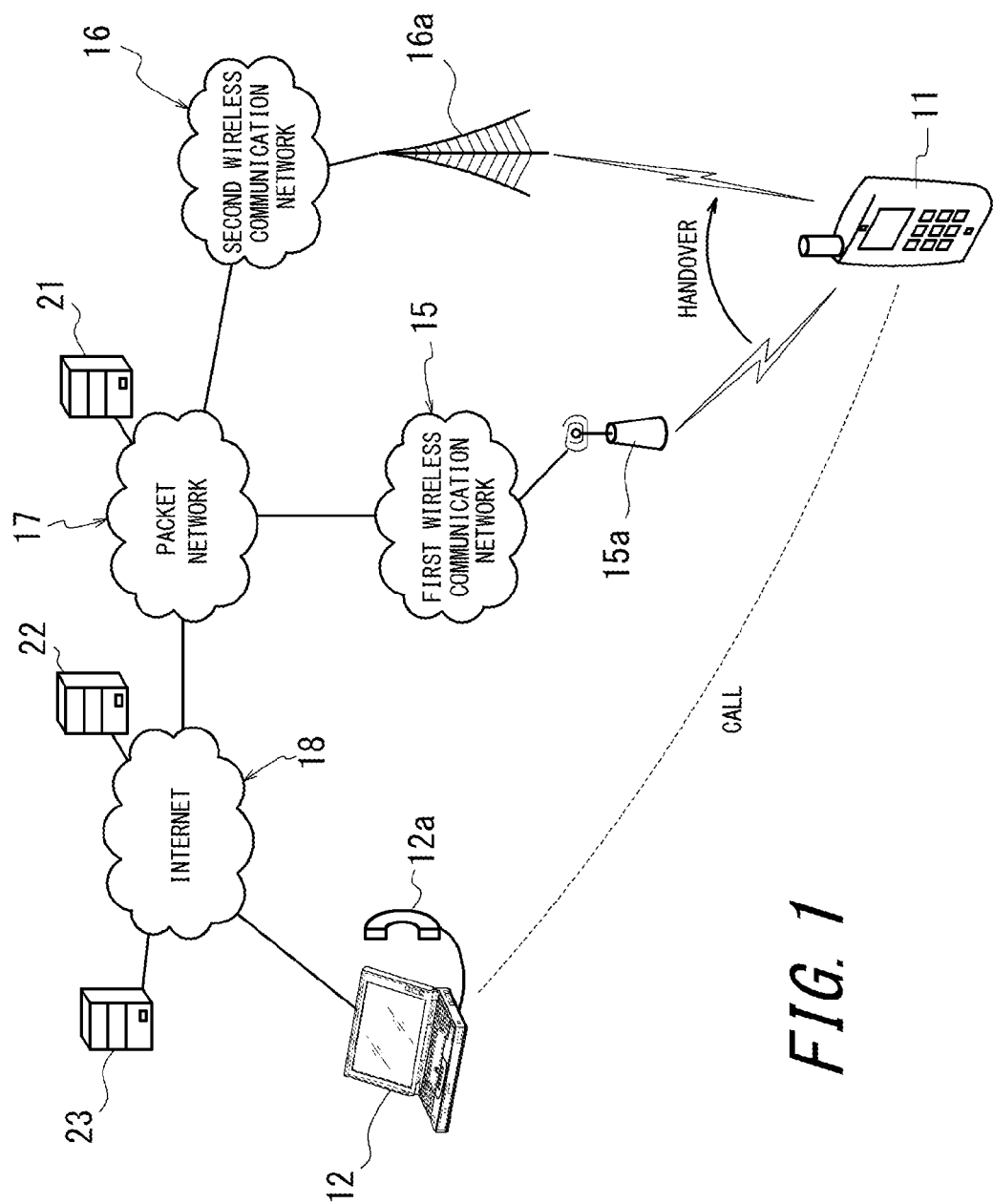
FIG. 1 is a diagram illustrating a schematic constitution of a communication network which a wireless communication apparatus according to an embodiment of the present invention can use.

REFERENCE SIGNS LIST 11 wireless communication apparatus
12 counterpart communication terminal
12a handset
15 first wireless communication network
15a access point
16 second wireless communication network
16a base station
17 packet network
18 internet
21, 22 SIP server
23 Home Agent (HA)
31 first wireless I/F
32 second wireless I/F
33 telephone function unit
34 communication processing unit
35 radio information obtaining unit
36 handover control unit
47 jitter buffer
50 jitter buffer monitoring unit
51 jitter buffer control unit
54 radio state monitoring unit
55 handover information obtaining unit
56 reproduction speed calculation unit
60 backbone network
61 measuring server
62 first information server
63 second information server
65 provider

DESCRIPTION OF EMBODIMENT

Embodiments of the present invention will be described with reference to the accompanying drawings.

FIG. 1 is a diagram illustrating a schematic constitution of a communication network which a wireless communication apparatus according to an embodiment of the present invention can use. FIG. 1 shows a case where a wireless communication apparatus 11, which is a mobile node, calls a counterpart communication terminal 12, which is a correspondent node, by using VoIP which is an application for real-time communication. The wireless communication apparatus 11 can perform handover between a first wireless communication network 15 and a second wireless communication network 16. The first wireless communication network and the second wireless communication network 16 are connected to the internet 18 via a packet network 17.

Here, for example, it is assumed that the first wireless communication network 15 is a wireless LAN (Local Area Network) and the second wireless communication network 16 is a mobile phone network of cdma2000 1xEV-DO (Code Division Multiple Access 2000 1x Evolution Data Only). It is also assumed that a delay time (downlink absolute delay time) of the first wireless communication network 15 is shorter than the delay time (downlink absolute delay time) of the second wireless communication network 16. In FIG. 1, a reference sign 15a represents an access point of the first wireless communication network 15, whereas a reference sign 16a represents a base station of the second wireless communication network 16.

The counterpart communication terminal 12 may be a personal computer, for example, having a handset 12a connected thereto and a softphone installed therein, and is connected to the internet 18 via an internet service provider (not shown).

The packet network 17 and the internet 18 are connected to SIP (Session Initiation Protocol) servers 21 and 22 for controlling communication, respectively. In addition, a Home Agent (HA) 23, for transferring received packets addressed to the wireless communication apparatus 11 to a wireless communication network to which the wireless communication apparatus 11 is connected, is connected to the internet 18.

In the communication network shown in FIG. 1, a home address used in the wireless communication network to which the wireless communication apparatus 11 originally belongs is registered to the HA 23, and a care-of address of the wireless communication network 16 of a handover destination is also registered to the HA 23 at handover. Thereby, the wireless communication apparatus 11 can perform handover between different wireless communication networks. Since such IP mobility techniques are known for Mobile IP and NEMO stated above, detailed description thereof is omitted here.

In the present embodiment, it is assumed that the wireless communication apparatus 11 registers an IP address of the first wireless communication network 15 as a care-of address (first wireless CoA) with the HA 23 and then performs handover to the second wireless communication network while communicating with the counterpart communication terminal 12 via the first wireless communication network 15.

Figure 2:
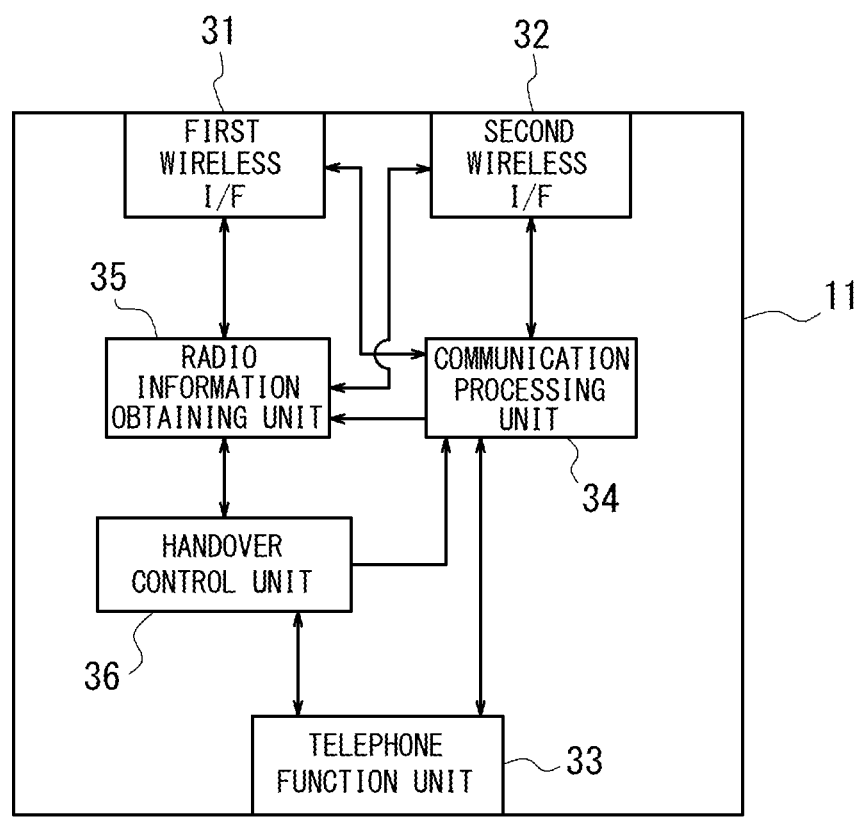
FIG. 2 is a block diagram illustrating a schematic constitution of the wireless communication apparatus shown in FIG. 1.

FIG. 2 is a functional block diagram illustrating a schematic constitution of the wireless communication apparatus 11 according to the present embodiment shown in FIG. 1. The wireless communication apparatus 11 includes a first wireless I/F (interface) 31 corresponding to the first wireless communication network 15, a second wireless I/F 32 corresponding to the second wireless communication network 16, a telephone function unit 33 constituting an execution unit for executing a VoIP application, a communication processing unit 34 for controlling connection to the fist wireless communication network 15 and the second wireless communication network 16, a radio information obtaining unit 35 for obtaining radio information of the first wireless communication network 15 and the second wireless communication network 16, and a handover control unit 36 for controlling handover between the first wireless communication network 15 and the second wireless communication network 16.

The communication processing unit 34 constitutes a wireless communication unit for performing a wireless communication. The communication processing unit 34 controls connection of the first wireless I/F 31 or the second wireless I/F 32 such that the telephone function unit 33 and the counterpart communication terminal 12 communicate each other via the first wireless communication network 15 or the second wireless communication network 16 and communicate with the HA 23 under control of the handover control unit 36.

The radio information obtaining unit 35 obtains communication quality of the first wireless communication network 15 and the second wireless communication network 16 from the first wireless I/F 31 and the second wireless I/F 32 correspondingly, and provides the handover control unit 36 with the communication quality obtained, as well as providing the telephone function unit 33 with the communication quality of the first wireless communication network 15, which is currently being used for a call. Here, RSSI (Received Signal Strength Indicator) indicating a radio state is obtained as the communication quality. The radio state of the second wireless communication network 16, which is not being used currently for a call, is obtained by receiving notification information transmitted from the base station 16a, for example. Accordingly, the radio information obtaining unit 35 constitute a communication quality obtaining unit for obtaining communication quality (radio state) of a wireless link.

The handover control unit 36 measures a downlink absolute delay time Tddn1 of the first wireless communication network 15 when connecting thereto. In addition, the handover control unit 36, during connecting to the first wireless communication network 15, determines whether to schedule handover, that is, whether to start handover preparation.

Therefore, the handover control unit 36 monitors the radio state (communication quality) of each of the first wireless communication network 15 and the second wireless communication network 16 obtained from the radio information obtaining unit 35. As a result, if the radio state of the first wireless communication network 15, which is calling by forming the wireless link, becomes lower than a predetermined handover schedule determination threshold of the first wireless communication network 15 and the radio state of the second wireless communication network 16 becomes higher than the handover schedule determination threshold, the handover control unit 36 determines a handover schedule to the second wireless communication network 16, that is, determines to start handover preparation. It is to be noted that the handover control unit 36 provides the telephone function unit 33 with the handover schedule determination threshold of the first wireless communication network 15, which is being used currently, when connecting to the first wireless communication network 15.

In addition, after determining the handover schedule, the handover control unit 36 calculates a handover preparation time T1 before start of handover and also measures a downlink absolute delay time Tddn2 of the handover destination of the wireless communication network (here, the second wireless communication network 16) of the handover destination. These information, together with information of the handover schedule determination and the downlink absolute delay time Tddn1 of the first wireless communication network 15 of the handover source currently being used which is already obtained, are provided as required handover information to the telephone function unit 33. Accordingly, the handover control unit 36 of the wireless communication apparatus 11 according to the present embodiment constitutes a determination unit for determining whether to start handover preparation, an estimate unit for estimating the handover preparation time and a measuring unit for measuring the delay time of each of the first wireless communication network 15 and the second wireless communication network 16.

Next, methods to obtain the handover preparation time T1, the downlink absolute delay time Tddn1 of the handover source and the downlink absolute delay time Tddn2 of the handover destination by the handover control unit 36 are described.

(Method to Obtain Handover Preparation Time T1)

The handover preparation time T1, as shown in FIGS. 3(a) and (b) for example, is calculated based on a change rate ΔRs (slope) of a radio state (Rs) in a unit time which determines the communication quality. Here, although the change rate ΔRs can be obtained by being measured at a time when handover schedule is determined as the radio state becomes lower than the handover schedule determination threshold, an average change rate ΔRsrms is obtained over a period from a predetermined time before the handover schedule is determined to the time when the handover schedule is determined, during the call in the present embodiment.

Consequently, the handover control unit 36, at a predetermined timing, calculates the change rate ΔRs(t) of the radio state of the wireless communication network currently being used in the unit time (Δt) by using the following formula, and stores a plurality of change rates ΔRs(t) to a predetermined time before (for example, 2 seconds before) in a memory. Then, when the handover schedule is determined, the handover control unit 36 calculates the average change rate ΔRsrms over a period to the predetermined time before, from change rates stored at the timing. Here, it is assumed that the radio state is gradually deteriorated.

$$\Delta Rs(t)=|\{Rs(t)-Rs(t-\Delta t)\}\Delta t| \quad \text{[Formula 1]}$$

Subsequently, the handover control unit 36 determines whether the average change rate ΔRsrms calculated is smaller than a change rate threshold Rsref determined in advance. As a result, if ΔRsrms≤Rsref is satisfied, that is, if the radio state changes gently, the handover preparation time T1 is set to a reference Tref (5 seconds, for example) determined in advance, as shown in FIG. 3(a).

In contrast, if ΔRsrms>Rsref is satisfied, that is, if the radio state changes rapidly, T1=Tref(Rsref/ΔRsrms) is calculated, for example, and the handover preparation time T1 is set to be shorter than the reference time Tref, as the average change rate ΔRsrms is greater. FIG. 3(b) shows a case where ΔRsrms>Rsref is satisfied and the handover preparation time T1 is set to be approximately half of the reference time Tref (2.5 seconds).

(Method to Obtain Absolute Delay Times Tddn1, Tddn2)

The downlink absolute delay time Tddn1 of the handover source and the downlink absolute delay time Tddn2 of the handover destination are obtained by one of first to fourth methods to obtain the absolute delay time described below.

(a) First Method to Obtain Absolute Delay Time

After determining the handover schedule, the handover control unit 36 controls the telephone function unit 33 and/or the communication processing unit 34 to request the HA 23, which is temporally synchronized with the wireless communication apparatus 11, to transmit measuring packets having transmission time stamps. Thereby, the HA 23 transmits the measuring packets to both of the first wireless communication network 15 and the second wireless communication network 16. The wireless communication apparatus 11 receives the measuring packets transmitted from the HA 23 via the first wireless I/F 31 and the second wireless I/F 32 correspondingly and measures the downlink absolute delay times Tddn1 and Tddn2 of corresponding networks based on reception times of the measuring packets and time stamps thereof. If the downlink absolute delay time of the wireless communication network of the handover source can be measured from the packets received during a call, transmission of the measuring packets to the wireless communication network can be omitted.

(b) Second Method to Obtain Absolute Delay Time

After determining the handover schedule, the handover control unit 36 controls the telephone function unit 33 and/or the communication processing unit 34 to accordingly notify the HA 23, which is temporally synchronized with the wireless communication apparatus 11. Thereby, in the same manner as the first method to obtain the absolute delay time described above, the HA 23 transmits the measuring packets to both of the first wireless communication network 15 and the second wireless communication network 16 so that the handover control unit 36 measures the downlink absolute delay times Tddn1, Tddn2 of the corresponding networks.

(c) Third Method to Obtain Absolute Delay Time

After determining the handover schedule, the handover control unit 36 controls the telephone function unit 33 and/or the communication processing unit 34 such that the wireless communication apparatus 11 transmits measuring packets such as PING and RTCP to the HA 23, which is temporally synchronized with the wireless communication apparatus 11, through both of the first wireless communication network 15 and the second wireless communication network 16, and then by receiving replies, measures the downlink absolute delay times Tddn1, Tddn2 of the corresponding networks.

It is to be noted that, in the above (a) to (c), the absolute delay time between the counterpart communication terminal (CN: Correspondent Node) 12 and the HA 23, as the network therebetween is not switched.

(d) Fourth Method to Obtain Absolute Delay Time

After determining the handover schedule, the handover control unit 36 obtains the downlink absolute delay time of each wireless communication network by using a handover scheme considered for IEEE 802.21. For IEEE 802.21 (Media Independent Handover (MIH)), as the handover scheme between different wireless networks (WiFi (Wireless Fidelity), WiMAX (Worldwide Interoperability for Microwave Access), a cellular phone and the like), it is considered that means for controlling handover (handover control unit 36 in FIG. 2) is defined as an MIH user, and that MIHF (MIH Function) obtains radio information of a communication device based on a request by the MIH user and provides the MIH user with the radio information. It is also considered that the MIH user obtains the information from an information server in the network being connected, through MIHF of its own terminal.

Figure 4:
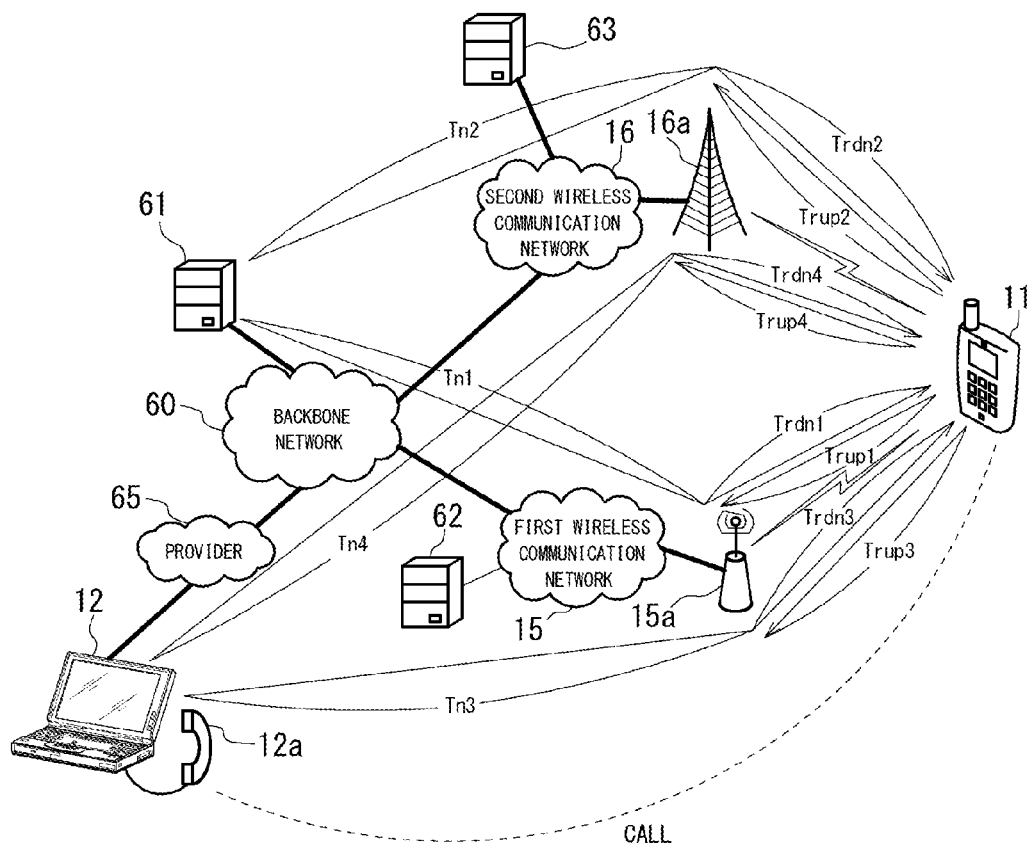
FIG. 4 is a diagram illustrating an exemplary method to obtain an absolute delay time by the handover control unit shown in FIG. 2.

FIG. 4 is a diagram illustrating the fourth method to obtain the absolute delay time. In FIG. 4, the first wireless communication network 15 and the second wireless communication network 16, together with other wireless communication networks, are connected to a backbone network 60 which constitutes the internet 18. A measuring server 61 for measuring the delay times is directly connected to the backbone network 60. In addition, the first wireless communication network 15 and the second wireless communication network 16 are connected to a first information server 62 and a second information server 63, respectively. The counterpart communication terminal 12 is connected to the backbone network 60 via a provider 65.

The first information server 62 stores references for measuring delay times: a network delay reference time Tn1 of one-way from the measuring server 61 to the access point 15*a*; and uplink and downlink wireless delay reference times Trup1 and Trdn1 from the access point 15*a* to the wireless communication apparatus connected to the access point 15*a*. Similarly, the second information server 63 stores references for measuring delay times: a network delay reference time Tn2 of one-way from the measuring server 61 to the base station 16*a*; and uplink and downlink wireless delay reference times Trup2 and Trdn2 from the base station 16*a* to the wireless communication apparatus connected to the base station 16*a*.

Here, the network delay reference times Tn1 and Tn2 are obtained by measuring round trip times between the access point 15*a* and the measuring server 61 and between the base station 16*a* and the measuring server 61, respectively, by transmitting and receiving packets (PING, RTCP and the like) and dividing the round trip time by 2.

In addition, in order to calculate the uplink and downlink wireless delay reference times Trup1 and Trdn1 of the first wireless communication network 15, the access point 15*a* transmits packets to the wireless communication apparatus connected to the access point 15*a* and temporally synchronized with the access point 15*a*, and the wireless communication apparatus which received the packets records reception times of the packets and then sends back the packets.

Similarly, in order to calculate the uplink and downlink wireless delay reference times Trup2 and Trdn2 of the second wireless communication network 16, the base station 16*a* transmits packets to the wireless communication apparatus connected to the base station 16*a* and temporally synchronized with the base station 16*a*, and the wireless communication apparatus which received the packets records reception times of the packets and sends back the packets.

The handover control unit 36 obtains the network delay reference time Tn1 and the wireless delay reference times Trdn1 and Trup1 from the first information server 62, connected to the first wireless communication network 15, via MIHF when connecting to the first wireless communication network 15. In addition, the handover control unit 36 transmits and receives packets to/from a counterpart to which a delay time is desired to be measured (here, the counterpart communication terminal 12 not being synchronized with the wireless communication apparatus 11) and measures a round trip time (Tn3+Trdn3+Tn3+Trup3) between the counterpart and the wireless communication apparatus 11 of its own. Then, the handover control unit 36 obtains a one-way delay time (Tn3−Tn1) between the counterpart communication terminal 12 and the measuring server 61 as follows from a value of the round trip time, and calculates Tn3+Trdn3, which corresponds to the downlink absolute delay time Tddn1 of the handover source between the wireless communication apparatus 11 and the counterpart communication terminal 12.

$$Tn3-Tn1=\{(Tn3+Trdn3+Tn3+Trup3)-(Tn1+Trdn1+Tn1+Trup1)\}/2 \ Tddn1=Tn3+Trdn3=Tn1+Trdn1+(Tn3-Tn1)$$ [Formula 2]

It is to be noted that Tn3+Trup3, corresponding to the uplink absolute delay time Tdrup1 of the handover source between the wireless communication apparatus 11 and the counterpart communication terminal 12 may be obtained by Tdrup1=Tn3+Trup3=Tn1+Trup1+(Tn3−Tn1).

In addition, after determining the handover schedule, the handover control unit 36 obtains the network delay reference time Tn2 and the wireless delay reference time Trdn2 of the handover destination. Therefore, the handover control unit 36 transmits a location information of the wireless communication apparatus 11 to the second information server 63 of the second wireless communication network 16 of the handover destination via the first information server 62 of the first wireless communication network 15, which is being connected currently, and request the network delay reference time Tn2 and the wireless delay reference time Trdn2. Thereby, the second information server 63 transmits the network delay reference time Tn2 and the wireless delay reference time Trdn2 of the base station 16*a*, to which the wireless communication apparatus 11 is supposed to connect, to the wireless communication apparatus 11 via the first information server 62, in consideration of the location information and the number of connected users of each base station.

The handover control unit 36 receives the network delay reference time Tn2 and the wireless delay reference time Trdn2 of the handover destination transmitted from the second information server 63 and, by using the obtained information and calculated (Tn3−Tn1), calculates Tn4+Trdn4 as follows, which corresponds to the downlink absolute delay time Tddn2 of the handover destination between the wireless communication apparatus 11 and the counterpart communication terminal 12.

$$Tddn2=Tn4+Trdn4=(Tn2+Trdn2)+(Tn3-Tn1)$$ [Formula 3]

It is to be noted that, by requesting the second information server 63 to transmit the wireless delay reference time Trup2, the handover control unit 36 may obtain Tn4+Trup4, which corresponds to the uplink absolute delay time Tdup2 of the handover destination between the wireless communication apparatus 11 and the counterpart communication terminal 12, using Tdup2=Tn4+Trup4=(Tn2+Trup2)+(Tn3−Tn1).

The handover control unit 36 stores the downlink absolute delay times Tddn1, Tddn2 obtained by one of the above first to fourth methods to obtain absolute delay time, together with the downlink absolute delay times obtained for other wireless communication networks in a similar manner, for each wireless communication network in a memory (not shown) in the handover control unit 36, and provides the downlink absolute delay times to the telephone function unit 33.

As described above, the handover control unit 36 obtains the information of the handover schedule determination, the handover preparation time T1, the downlink absolute delay time Tddn1 of the handover source, and the downlink absolute delay times of other wireless communication networks including the downlink absolute delay time Tddn2 of the handover destination, and provides such information to the telephone function unit 33.

In addition, after determining the handover schedule, the handover control unit 36 controls the communication processing unit 34 to connect the second wireless I/F 32 to the second wireless communication network 16. Then, when the handover preparation time T1 has passed, the handover control unit 36 transmits Registration Request (Binding Update in NEMO) to the HA 23 via the second wireless communication network 16 of the handover destination and registers the care-of address of the handover destination to the HA 23.

At that time, the handover control unit 36 sets eight bits of Registration Request Field of the Registration Request message (using Multiple care-of address in NEMO) into the communication processing unit 34, so as to be able to communicate with either the first wireless communication network 15 or the second wireless communication network 16.

Then, after receiving Registration Reply (Binding Acknowledge in NEMO), which is the handover completion information transmitted from the HA 23, the handover control unit 36 deregisters the care-of address of the first wireless communication network 15 of the handover source and disconnects. Thereafter, the handover control unit 36 controls the communication processing unit 34 so as to maintain the VoIP application via the second wireless communication network 16 of the handover destination and provides the telephone function unit 33 with the handover completion information received.

Next, the telephone function unit 33 is described.

Figure 5:
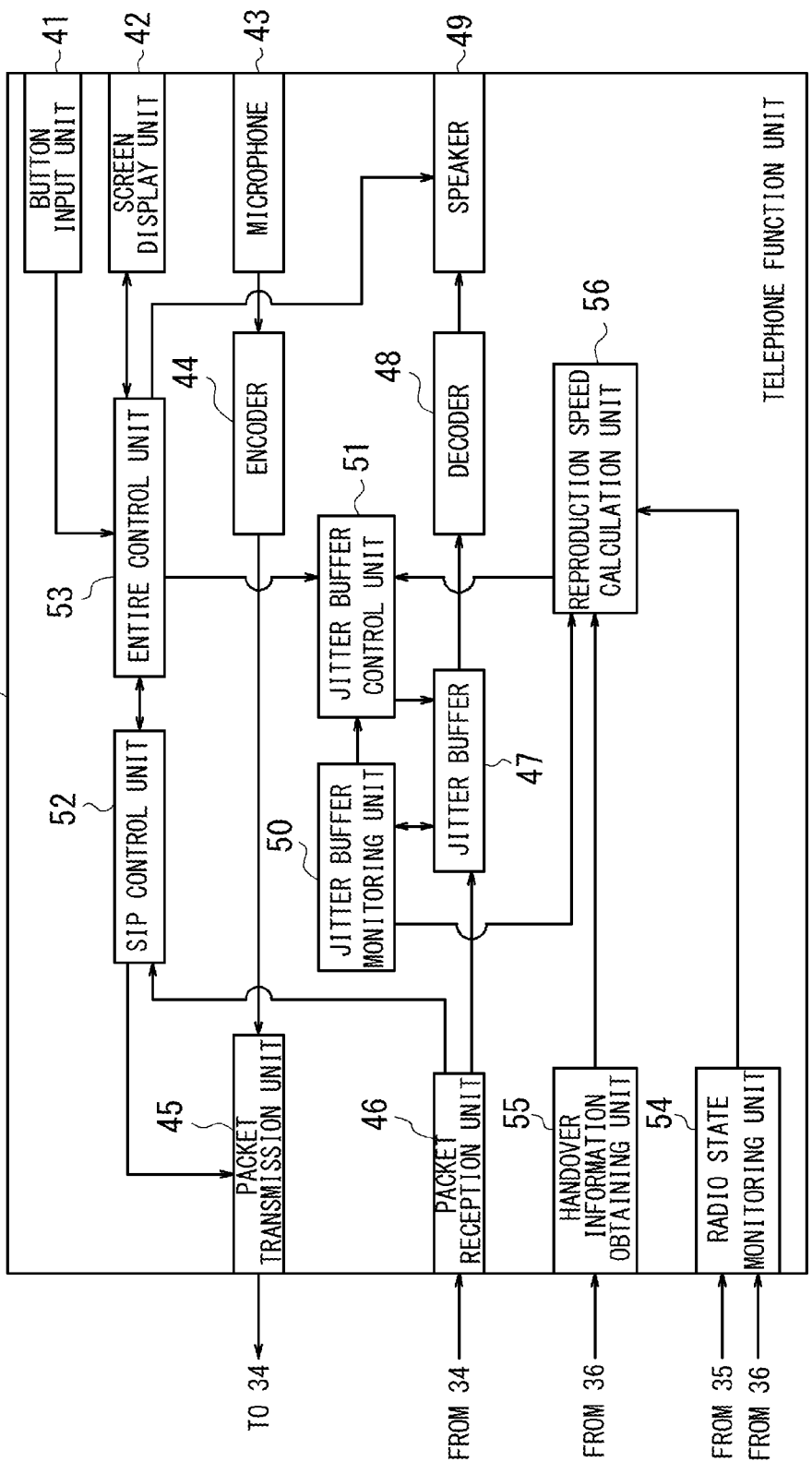
FIG. 5 is a functional block diagram illustrating a schematic constitution of a telephone function unit shown in FIG. 2.

FIG. 5 is a functional block diagram illustrating a schematic constitution of the telephone function unit 33 of the wireless communication apparatus 11 shown in FIG. 2. The telephone function unit 33 may be a softphone, for example, and, in the same manner as a constitution of a known softphone, provided with a button input unit 41, a screen display unit 42, a microphone 43, an encoder 44, a packet transmission unit 45, a packet reception unit 46, a jitter buffer 47, a decoder 48, a speaker 49, a jitter buffer monitoring unit 50, a jitter buffer control unit 51, a SIP control unit 52, and an overall control unit 53 for controlling the overall operation.

The overall control unit 53 obtains operation information by a user via the button input unit 41 or the screen display unit 42 and controls the overall operation based on the information obtained. The SIP control unit 52 controls SIP procedure to start and end the call. During the call, audio data obtained from the microphone 43 are encoded by the encoder 44 and encoded data are inserted into the packet by the packet transmission unit 45 and transmitted to the counterpart communication terminal 12 via the communication processing unit 34.

The packet from the counterpart communication terminal 12 received by the packet reception unit 46 via the communication processing unit 34 is once stored in the jitter buffer 47 and then read out. Payload of the packet read out is decoded by the decoder 48 and output as reproduced voice from the speaker 49. A packet receiving state of the jitter buffer 47 and the number of packets (data amount) in the jitter buffer 47 are monitored by the jitter buffer monitoring unit 50 and, based on a result of monitoring, the jitter buffer control unit 51 controls a speed to read out the packets from the jitter buffer 47 and processing to discard the received packets.

In the wireless communication apparatus 11 according to the present embodiment, the telephone function unit 33 is further provided with a radio state monitoring unit 54, a handover information obtaining unit 55 and a reproduction speed calculation unit 56. The radio state monitoring unit 54 obtains the radio state of the first wireless communication network 15, which is currently being used, from the radio information obtaining unit 35. In addition, the radio state monitoring unit 54 obtains a handover schedule determination threshold of the radio state of the first wireless communication network 15 currently being used, the information on the handover schedule determination/completion, and the downlink absolute delay time of each wireless communication network and, based on such information obtained, sets an upper limit of accumulated packets in the jitter buffer 47, as described below, and provides it to the reproduction speed calculation unit 56.

The handover information obtaining unit 55 monitors the handover information from the handover control unit 36 at predetermined intervals to detect whether there is the information of the handover schedule determination. If there is the information of the handover schedule determination, the handover information obtaining unit 55 further obtains required handover information from the handover control unit 36 and provides the reproduction speed calculation unit 56 with the information obtained.

When the information of the handover schedule determination is not input from the handover information obtaining unit 55, the reproduction speed calculation unit 56, based on a set value of the upper limit of accumulation of the jitter buffer 47 input from the radio state monitoring unit 54 and a result of monitoring the jitter buffer 47 by the jitter buffer monitoring unit 50, controls the reproduction speed of the packets, that is, the reproduction speed of the application being executed (the reproduction speed of the VoIP application in the present embodiment) via the jitter buffer control unit 51 such that the amount of accumulated packets in the jitter buffer 47 becomes equal to the set value stated above.

In addition, when the handover schedule information is input from the handover information obtaining unit 55, the reproduction speed calculation unit 56 determines whether to control the reproduction speed of the application being executed based on the handover information obtained from the handover information obtaining unit 55. If determines to control as a result, the reproduction speed calculation unit 56 calculates the reproduction speed of the received packets based on the handover information obtained and the result of monitoring the jitter buffer 47 by the jitter buffer monitoring unit 50, and provides the jitter buffer control unit 51 with a calculation result. Thereby, the jitter buffer control unit 51 controls reading out of the received packets from the jitter buffer 47 such that the reproduction speed of the received packets becomes equal to the reproduction speed calculated by the reproduction speed calculation unit 56. Accordingly, a changing unit of the upper limit of accumulation of the jitter buffer 47 and the control unit of the reproduction speed of the application are constituted to include the radio state monitoring unit 54, the reproduction speed calculation unit 56, the jitter buffer monitoring unit 50 and the jitter buffer control unit 51.

Figure 6:
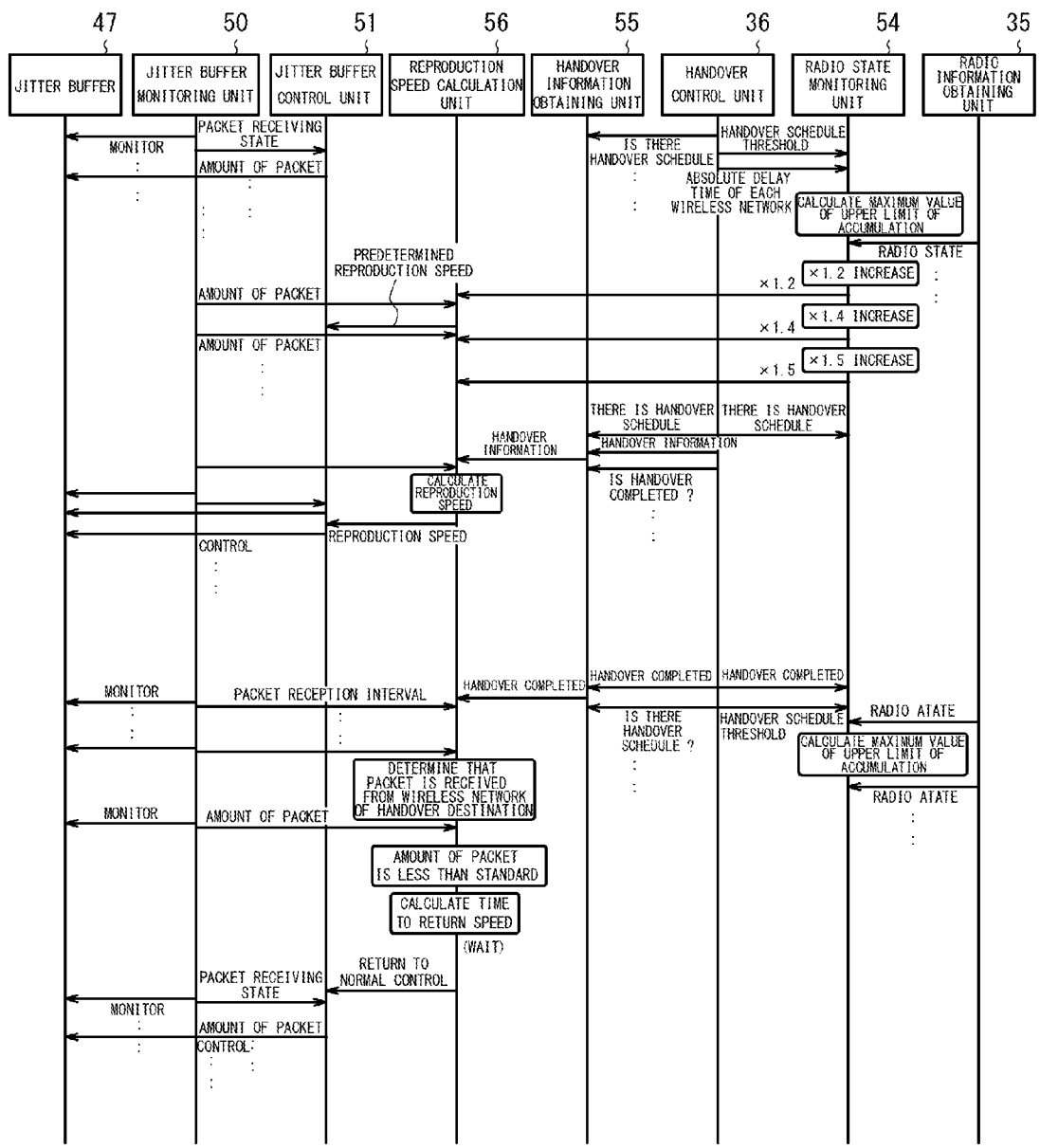
FIG. 6 is a sequence diagram illustrating operations of a main section of the telephone function unit shown in FIG. 5.

Following is a further detailed description of operations by the telephone function unit 33 with reference to a sequence diagram shown in FIG. 6.

First, operations by the radio state monitoring unit 54 are described. When the information of the handover schedule determination is not input from the handover control unit 36, the radio state monitoring unit 54 sets the upper limit of accumulation of the packets in the jitter buffer 47 based on the radio state obtained from the radio information obtaining unit 35 and provides it to the reproduction speed calculation unit 56.

Therefore, the radio state monitoring unit 54 first calculates a maximum value kmax of an increased amount of accumulated packets in the jitter buffer 47 based on the downlink absolute delay time in each wireless communication network (total N) obtained from the handover control unit 36. The maximum value kmax is calculated by the following formula, for example. That is, results of subtracting the absolute delay time Tddn1 of the first wireless communication network 15 currently being used from respective absolute delay times of the wireless communication networks currently not being used are shown as D1, D2, D3, . . . . If a difference is below zero, it is defined as zero and an average of the differences is obtained. For example, ½ of the average is defined as the maximum value kmax.

$$k\max = [(D1+D2+D3+\ldots)/(N-1)]/2 \qquad \text{[Formula 4]}$$

After the maximum value kmax is calculated, the radio state monitoring unit 54 sets a plurality of changing thresholds for changing the upper limit of accumulation (increased amount) of the jitter buffer 47 based on the radio state of the first wireless communication network 15, which is currently being used, obtained from the radio information obtaining unit 35, such that the increased amount of accumulated packets in the jitter buffer 47 meets the maximum value kmax, near the handover schedule determination threshold obtained from the handover control unit 36. Accordingly, if the absolute delay time of the wireless communication network currently not being used is shorter than that of the first wireless communication network 15 currently being used, for example, the increased amount of accumulated packets is zero.

Figure 7:
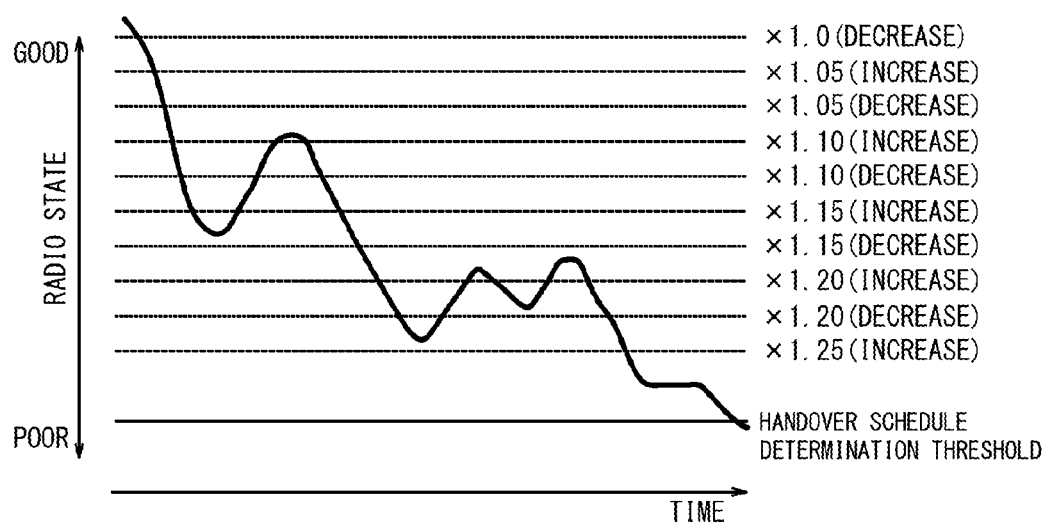
FIG. 7 is a diagram illustrating a relationship between a radio state and a changing threshold of each upper limit of accumulation for showing a method to control the upper limit of accumulation of the jitter buffer shown in FIG. 5.

In addition, for example, if the absolute delay time Tddn1 of the first wireless communication network 15 currently being used is 70 msec, the absolute delay time of the second wireless communication network 16 which has been measured and stored is 50 msec, the absolute delay time of the third wireless communication network is 170 msec, and the absolute delay time of the fourth wireless communication network is 210 msec, the maximum value kmax is calculated by kmax=(0+100+140)/{(4−1)2}=40 (msec). In this case, if a standard amount of accumulated packets in the jitter buffer 47 is 160 msec, the maximum amount of accumulated packets, that is, the maximum upper limit of accumulation is 1.25 times (200 msec) of a standard. Accordingly, in this case, the changing threshold of each upper limit of accumulation is set such that the upper limit of accumulation in the jitter buffer 47 is 1.25 times of the standard, near the handover schedule determination threshold, and that the multiplying factor becomes smaller as the radio state is better, as shown in FIG. 7. If the radio state is better than a predetermined value, the upper limit of accumulation is set to the standard (multiplying factor 1.0).

Figure 8:
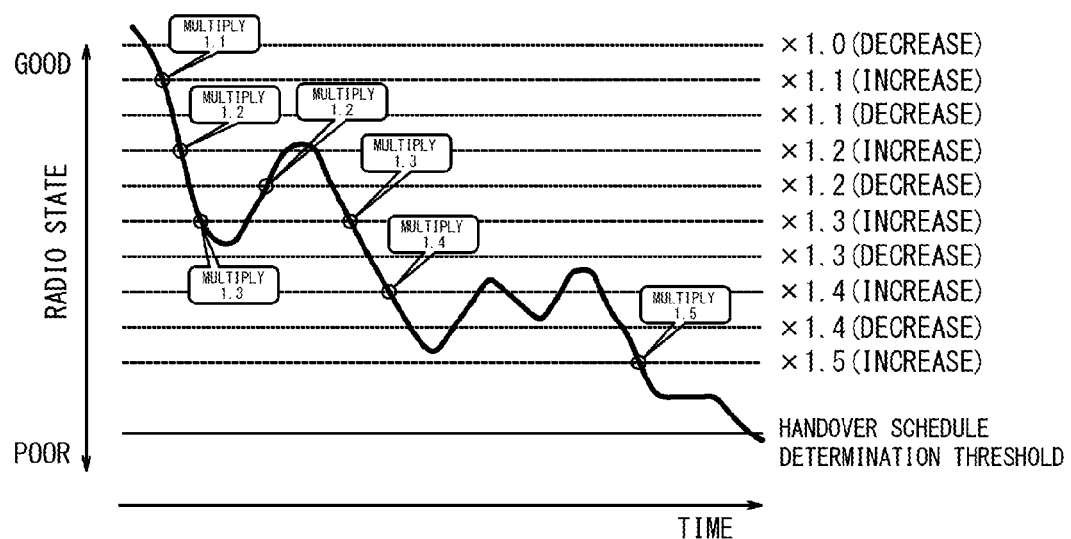
FIG. 8 is a diagram illustrating the relationship between the radio state and the changing threshold of each upper limit of accumulation for showing another method to control the upper limit of accumulation of the jitter buffer shown in FIG. 5.

Moreover, for example, if the absolute delay time Tddn1 of the first wireless communication network 15 currently being used is 70 msec, the absolute delay time of the second wireless communication network 16 which has been measured and stored is 310 msec, the absolute delay time of the third wireless communication network is 170 msec, and the absolute delay time of the fourth wireless communication network is 210 msec, the maximum value kmax is calculated by kmax=(240+100+140)/{(4−1)2}=80 (msec). In this case, if a standard amount of the accumulated packets in the jitter buffer 47 is 160 msec, the maximum amount of the accumulated packets is 1.5 times (240 msec) of the standard. Accordingly, in this case, the changing threshold of each upper limit of accumulation is set such that the upper limit of accumulation in the jitter buffer 47 is 1.5 times of the standard, near the handover schedule determination threshold, and that the multiplying factor becomes smaller as the radio state is better and becomes at the standard (multiplying factor 1.0) when the radio state is at the predetermined value, as shown in FIG. 8.

It is to be noted that, in FIG. 7 and FIG. 8, "(increase)" of each changing threshold (multiplying factor) is an increasing changing threshold to be applied if the radio state falls below this value crossing it, whereas "(decrease)" is a decreasing changing threshold to be applied if the radio state surpasses this value crossing it. For the same changing threshold, the decreasing changing threshold is set lower than the increasing changing threshold. Thereby, if the radio state falls below the increasing changing threshold of "×1.2(increase)", the upper limit of accumulation of the jitter buffer 47 is increased to 1.2 times of the standard value. Then, if the radio state recovers to surpass the decreasing changing threshold f "33 1.1(decrease)", the upper limit of accumulation of the jitter buffer 47 is increased to 1.1 times of the standard value.

Next, the radio state monitoring unit 54 obtains the radio states from the radio information obtaining unit 35 at predetermined intervals and averages the radio states in the predetermined period, so as to observe whether an average value obtained thereby exceeds or falls below the changing threshold of each upper limit of accumulation. If the average value exceeds or falls below the changing threshold, the radio state monitoring unit 54 provides the reproduction speed calculation unit 56 with the changing threshold as the set value of the upper limit of accumulation.

The above processing is performed until the radio state monitoring unit 54 obtains the information of the handover schedule determination from the handover control unit 36. After receiving the information of the handover schedule determination, the radio state monitoring unit 54 suspends monitoring the radio state. Then, after obtaining the handover completion information from the handover control unit 36, the radio state monitoring unit 54 obtains the handover schedule determination threshold of the radio state of a new wireless communication network of the handover destination (in this case, the second wireless communication network 16) and the downlink absolute delay time of each wireless communication networks, and set the upper limit of accumulated packets in the jitter buffer 47 and provides it to the reproduction speed calculation unit 56 in a similar manner as stated above.

Next, operations of the reproduction speed calculation unit 56 are described in further detail.

If the information of the handover schedule determination is not input from the handover information obtaining unit 55, the reproduction speed calculation unit 56 monitors the upper limit of accumulation from the radio state monitoring unit 54. When the upper limit of accumulation is input, the reproduction speed calculation unit 56 obtains a current amount of accumulated packets in the jitter buffer 47 from the jitter buffer monitoring unit 50 and compares the accumulated amount obtained and the upper limit of accumulation set by the radio state monitoring unit 54.

If the current accumulated amount is smaller than the upper limit of accumulation as a result, the reproduction speed calculation unit 56 instructs the jitter buffer control unit 51 to set the first reproduction speed Vs, which is slower than the standard reproduction speed V1 (for example, 80% of V1), as the reproduction speed V. In contrast, if the current accumulated amount exceeds the upper limit of accumulation, the reproduction speed calculation unit 56 instructs the jitter buffer control unit 51 to set the second reproduction speed Vf, which is faster than the standard reproduction speed V1 and closer thereto than the first reproduction speed Vs to the standard reproduction speed V1 (for example, 110% of V1), as the reproduction speed V. Then, the reproduction speed calculation unit 56 obtains the amount of the accumulated packets in the jitter buffer 47 from the jitter buffer monitoring unit 50 to continue to compare it with the upper limit of accumulation set by the radio state monitoring unit 54. If the amount of the accumulated packets meets the upper limit of accumulation, the reproduction speed calculation unit 56 instructs the jitter buffer control unit 51 to return the reproduction speed V to the standard reproduction speed V1.

As described above, when there is no handover schedule, the reproduction speed calculation unit 56 has three reproduction speeds: the standard reproduction speed V1, the first reproduction speed Vs slower than the standard reproduction speed V1, and the second reproduction speed Vf faster than the reproduction speed V1. The reproduction speed calculation unit 56 appropriately selects one of the three reproduction speeds based on a comparison with the current amount of accumulated packets in the jitter buffer 47 and the upper limit of accumulation in accordance with the radio state, and controls the number of packets in the jitter buffer 47. Additionally, the changing threshold of the upper limit of accumulation of the jitter buffer 47 is changed based on increase and decrease of the radio state. Moreover, the second reproduction speed Vf, which is faster than the standard for controlling the amount of the accumulated packets, is set closer to the standard reproduction speed V1 than the first reproduction speed Vs, which is slower than the standard. That is, the increased speed amount of the fast second reproduction speed Vf with respect to the standard reproduction speed V1 is set smaller than the decreased speed amount of the slow first reproduction speed Vs. Accordingly, even if the radio state deteriorates varying up and down as shown in FIG. 7 and FIG. 8, it is possible to increase the amount of the accumulated packets in the jitter buffer 47 following such deterioration.

On the other hand, when the information of handover schedule determination is input from the handover information obtaining unit 55, the reproduction speed calculation unit 56 calculates the reproduction speed V based on the handover information from the handover information obtaining unit 55.

First, the reproduction speed calculation unit 56 calculates a difference T2 (T2=Tddn2−Tddn1) between the downlink absolute delay time (Tddn2) of the second wireless communication network 16 and the downlink absolute delay time (Tddn1) of the first wireless communication network 15 based on the required handover information obtained from the handover information obtaining unit 55, and determines whether T2 exceeds a predetermined value (>0).

If the delay time difference T2 exceeds the predetermined value as a result, the reproduction speed calculation unit 56, based on the required handover information obtained and the result of monitoring the jitter buffer 47 by the jitter buffer monitoring unit 50, calculates the reproduction speed V of the received packets in the jitter buffer 47 by using the following formula, such that the number of packets in the jitter buffer 47 becomes a number corresponding to the standard reproduction speed V1 at the time to start receiving packets from the second wireless communication network 16 of the handover destination. In the following formula, Ta represents a jitter buffer standard delay time corresponding to a standard number of packets in the jitter buffer 47 corresponding to the standard reproduction speed V1, whereas Tb represents a delay time corresponding to the number of packets in the jitter buffer 47 at a time to receive the information of the handover schedule determination. In addition, reproduction speeds V and V1 are expressed by a time ratio (sec/sec) and V=1, for example.

$$V=(Tb-Ta+V1 \times T1)/(T1+T2)$$ [Formula 5]

The reproduction speed calculation unit 56 provides the jitter buffer control unit 51 with the reproduction speed V calculated and thereby controls reading out of received packets from the jitter buffer 47 so as to reproduce the received packets at the reproduction speed V slower than the standard reproduction speed V1.

Subsequently, when receiving the handover completion information from the handover information obtaining unit 55, the reproduction speed calculation unit 56 obtains reception intervals of the packets from the jitter buffer monitoring unit 50 at predetermined intervals and calculates an average value of the reception intervals obtained in a predetermined period, and then monitors whether a difference between the average value of the reception intervals of the packets calculated and the standard reception interval of the VoIP application is within a predetermined threshold.

If the difference is in the threshold as a result, the reproduction speed calculation unit 56 determines that the packets are received from the handover destination and obtains the number of packets (data amount) in the jitter buffer 47 at this time from the jitter buffer monitoring unit 50, and then determines whether the number of packets obtained exceeds a predetermined amount.

If the number of packets in the jitter buffer 47 does not exceed the predetermined amount as a result, the reproduction speed calculation unit 56 instructs the jitter buffer control unit 51 to return the reproduction speed to the normal reproduction speed after t=(Ta−Tb)/(V1−V) is satisfied. In contrast, if the number of packets in the jitter buffer 47 exceeds the predetermined amount, the reproduction speed calculation unit 56 instructs the jitter buffer control unit 51 to return the reproduction speed to the normal reproduction speed immediately. That is, if the reproduction speed calculation unit 56 determines that packets are received from the handover destination, the jitter buffer control unit 51 controls reading out of the jitter buffer 47 such that the reproduction speed returns to the standard reproduction speed V1 if the number of packets in the jitter buffer 47 exceeds the predetermined amount.

Control of the reproduction speed by the jitter buffer control unit 51 is performed as follows, for example.

(When Controlling Reproduction Speed V to be Faster than Standard)

In this case, it is defined that TR=TR1/V, where TR1 is a reading out interval of the packets from the jitter buffer 47 to the standard reproduction speed V1 and TR is a reading out interval of the packets from the jitter buffer 47 corresponding to the reproduction speed V selected or calculated. For example, for the VoIP application which reads out the packets in the jitter buffer 47 at intervals of 20 msec at the standard reproduction speed V1, if the reproduction speed V is the second reproduction speed Vf, which is 110% of V1 as stated above, the reading out interval TR of the packets from the jitter buffer 47 is set as TR=20/1.1 (msec).

(When Controlling Reproduction Speed V to be Slower than Standard)

This case is performed by one of a first reproduction speed control method or a second reproduction speed control method described as follows.

(a) First Reproduction Speed Control Method

In the same manner as the above case which controls the reproduction speed V to be faster than the standard, the read out interval TR of the packets from the jitter buffer 47 corresponding to the reproduction speed V is defined as TR=TR1/V. For example, similarly to the above case, in order to render the reproduction speed V to be 80% of the standard reproduction speed V1 for the VoIP application which reads out and reproduces the packets in the jitter buffer 47 at intervals of 20 msec at the standard reproduction speed V1, the reading out interval TR of the packets from the jitter buffer 47 is set as TR=20/0.8 (msec).

(b) Second Reproduction Speed Control Unit

When the control of the reproduction speed for handover is started, a time stamp of a packet reproduced immediately thereafter (first packet) and a reproduction time thereof are recorded in combination. Packets thereafter are read out and reproduced from the jitter buffer 47 at a time Tv in the following formula. In the following formula, TD represents the delay time and an initial value thereof is zero.

$$Tv=(\text{time stamp of packet}-\text{time stamp of first packet})+(\text{reproduction time of first packet}+TD)$$ [Formula 6]

Figure 9:
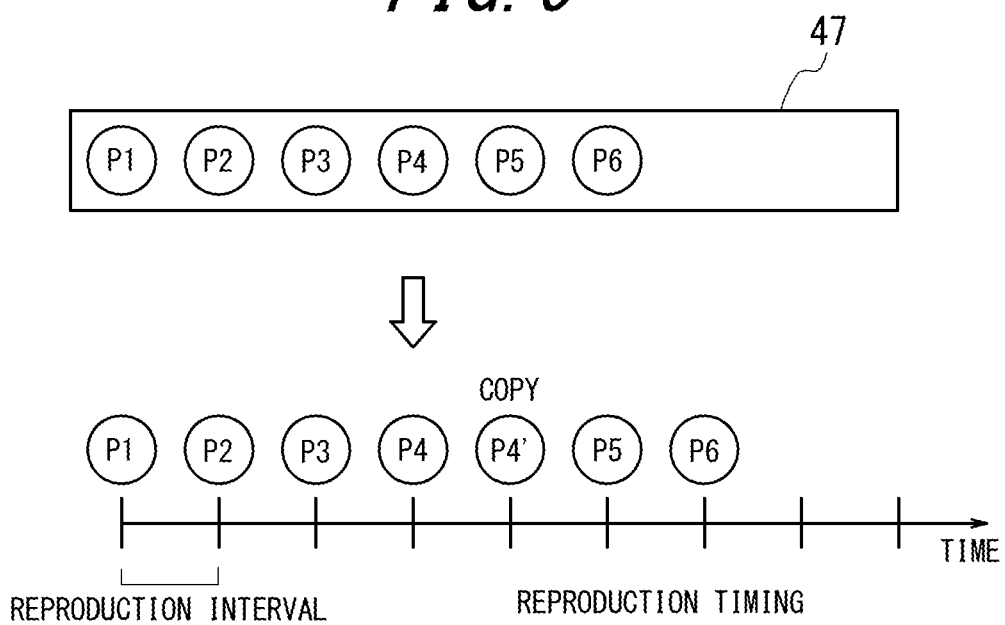
FIG. 9 is a diagram illustrating an exemplary control method of the reproduction speed of received packets by a jitter buffer control unit shown in FIG. 5.

Here, when the packets are read out from the jitter buffer 47, a packet read out at [{V1/(V1−V)}−1]th is copied and stored in a memory in the decoder 48. After reproduction of the original packet, the copied packet is read out and reproduced at next reproduction timing. For example, in order to render the reproduction speed V to be 80% of the standard reproduction speed V1, four sequential packets P1 to P4 in the jitter buffer 47 are read out and reproduced sequentially and the fourth packet P4 is copied, and a copied packet P4' is reproduced at a next reproduction timing after reproduction of the original packet P4, as shown in FIG. 9. Then, when a packet P5 is read out from the jitter buffer 47, TD in the above Formula 6 is increased as long as the time of reproduction intervals by copying. It is to be noted that, if the packet to be read out at [{V1/(V1−v)}−1]th is not in the jitter buffer 47 because of not being received yet or being discarded, the same processing is performed on a packet at a next reproduction timing.

Figure 10:
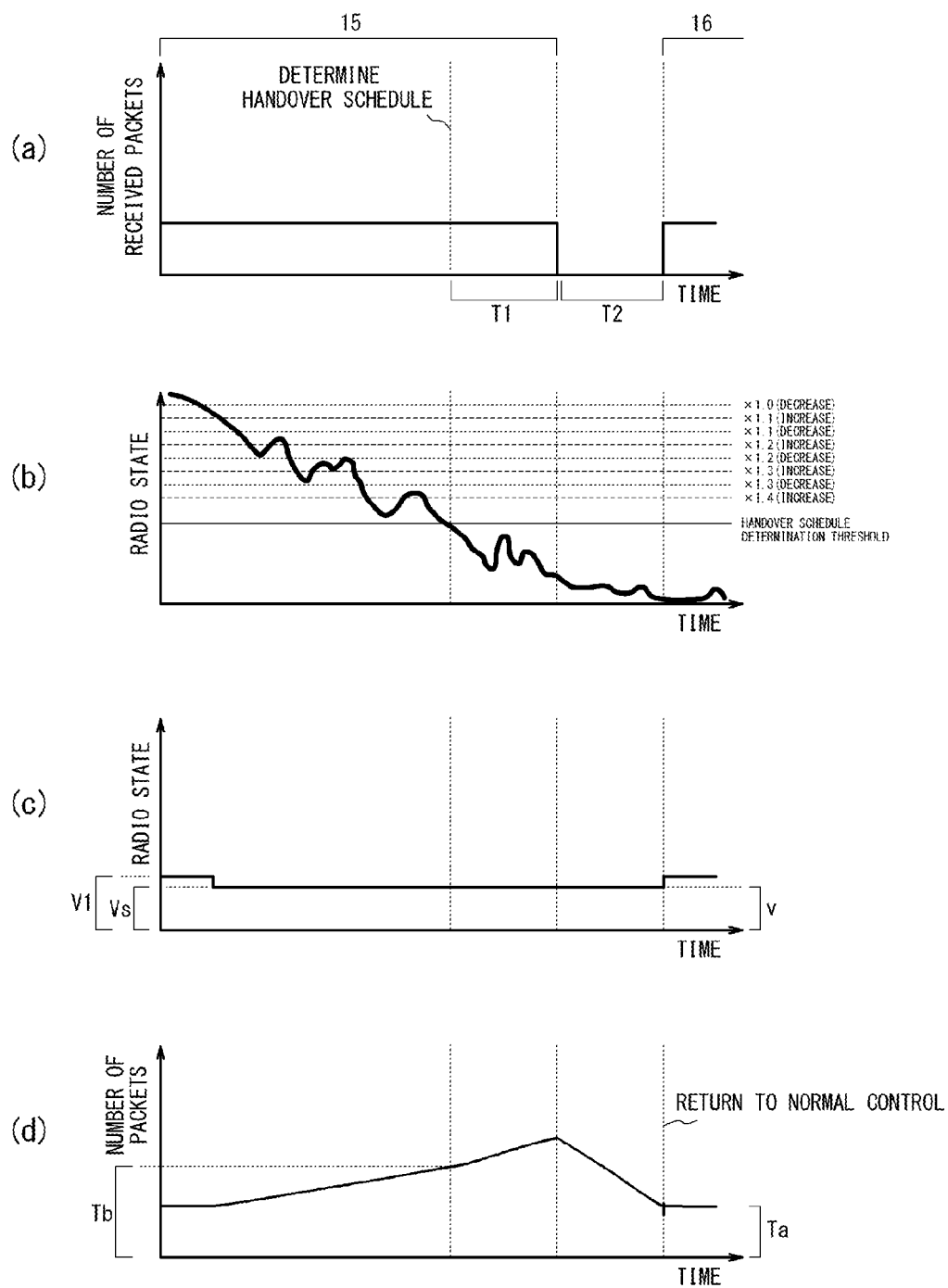
FIG. 10 is diagrams illustrating a control method of the jitter buffer according to the present embodiment.

FIG. 10 is a diagram illustrating a control method of the jitter buffer 47 according to the present embodiment. In FIG. 10, (a) shows the number of packets received by the jitter buffer 47 for a unit period; (b) shows the radio state of the handover source and the changing threshold of each of the upper limits of accumulation of the jitter buffer 47; (c) shows the reproduction speed (reading out intervals) of the packets from the jitter buffer 47; and (d) shows the number of packets in the jitter buffer 47.

Figure 11:
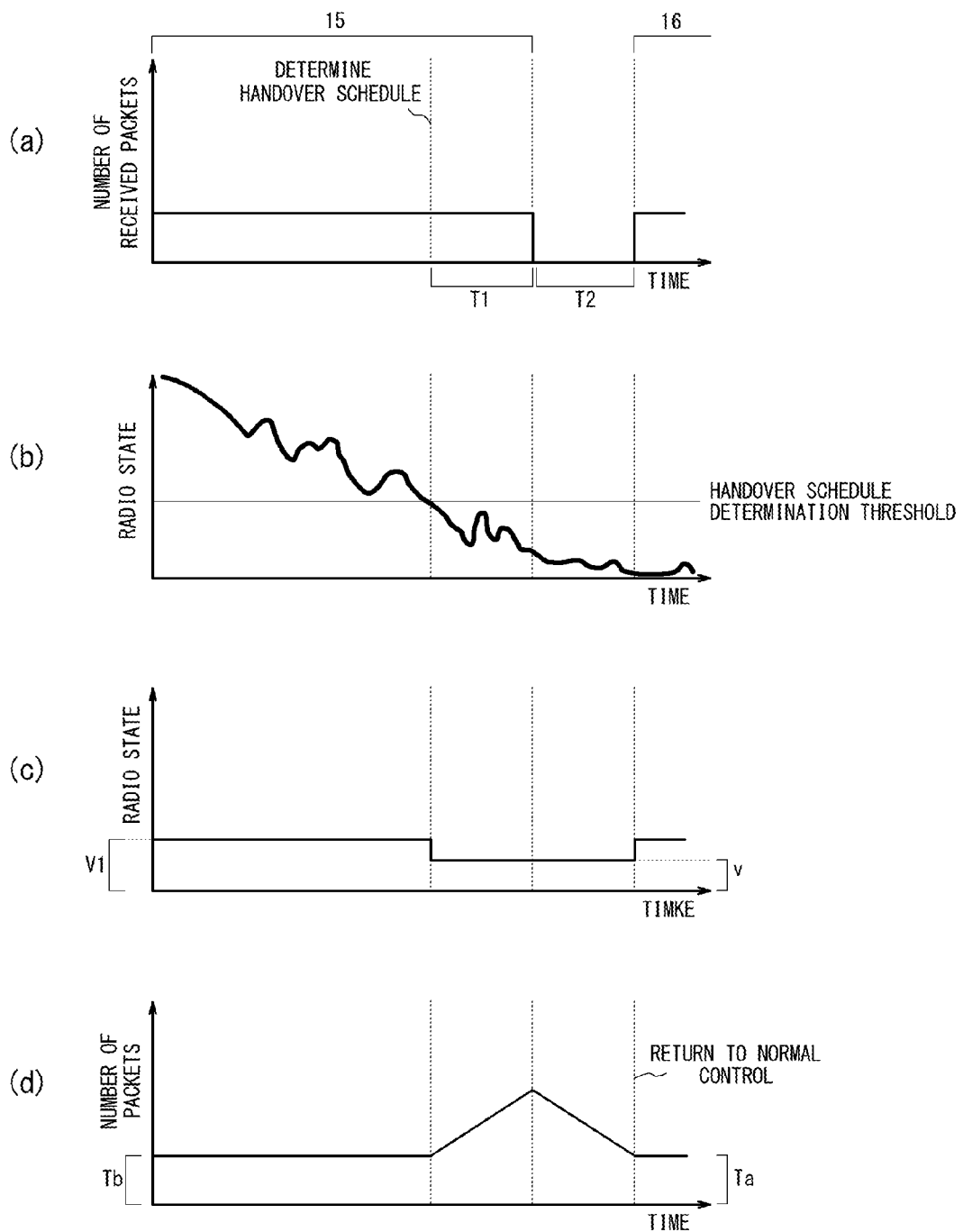
FIG. 11 is diagrams illustrating a control method of the jitter buffer if the upper limit of accumulation of the jitter buffer is not changed before handover schedule determination, for a comparison with FIG. 10.

FIG. 11 is a diagram, for comparison with FIG. 10, illustrating a control method of the jitter buffer 47 so as not to change the upper limit of accumulation of the jitter buffer 47 before determination of the handover schedule and to control the reproduction speed V based on Formula 5 shown above in response to determination of the handover schedule. In FIG. 11, although FIG. 11(a) to (d) are the same as FIG. 10(a) to (d) respectively, since the upper limit of accumulation of the jitter buffer 47 is not changed in this comparative example, the changing threshold of the upper limit of accumulation is not shown in FIG. 11(b).

Figure 12:
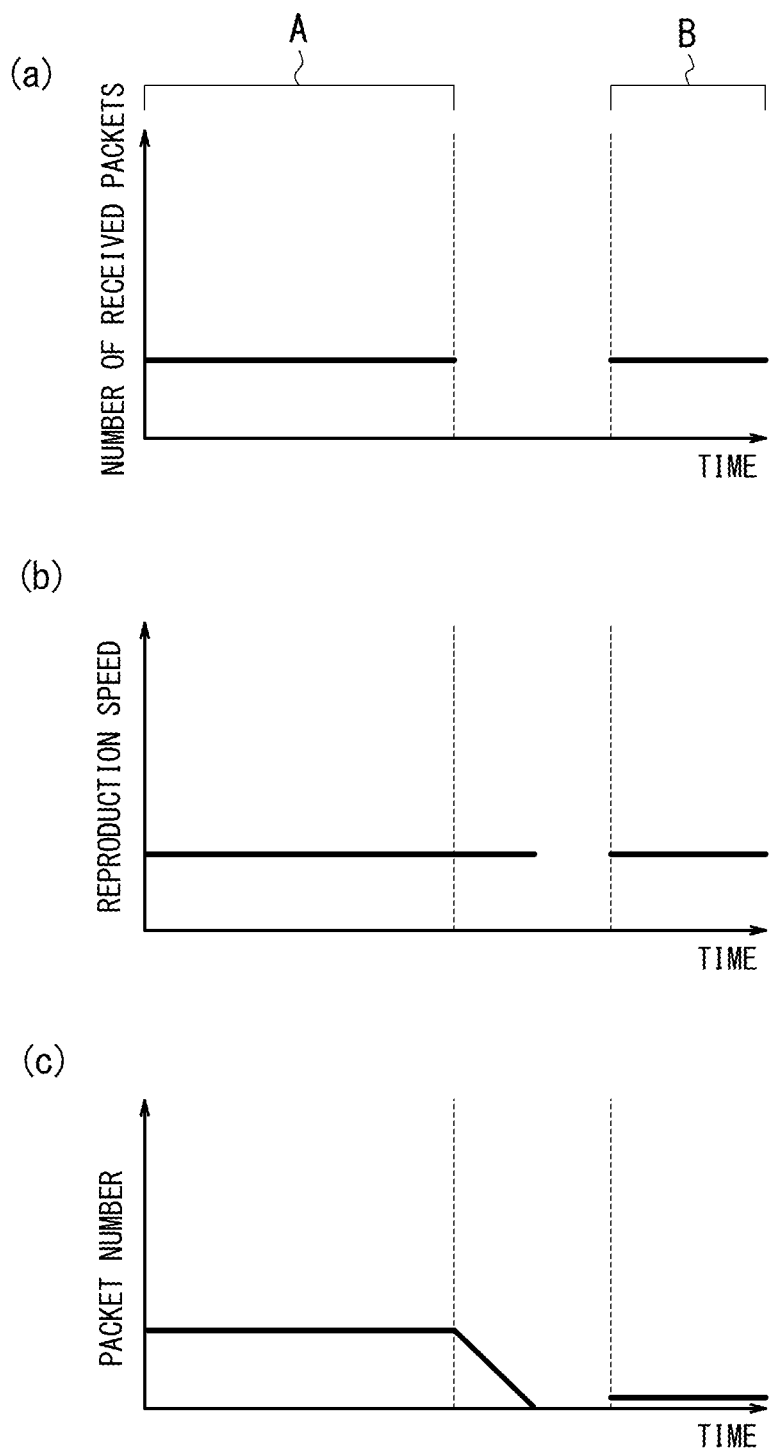
FIG. 12 is diagrams illustrating an example of the conventional control method of the jitter buffer.
Figure 13:
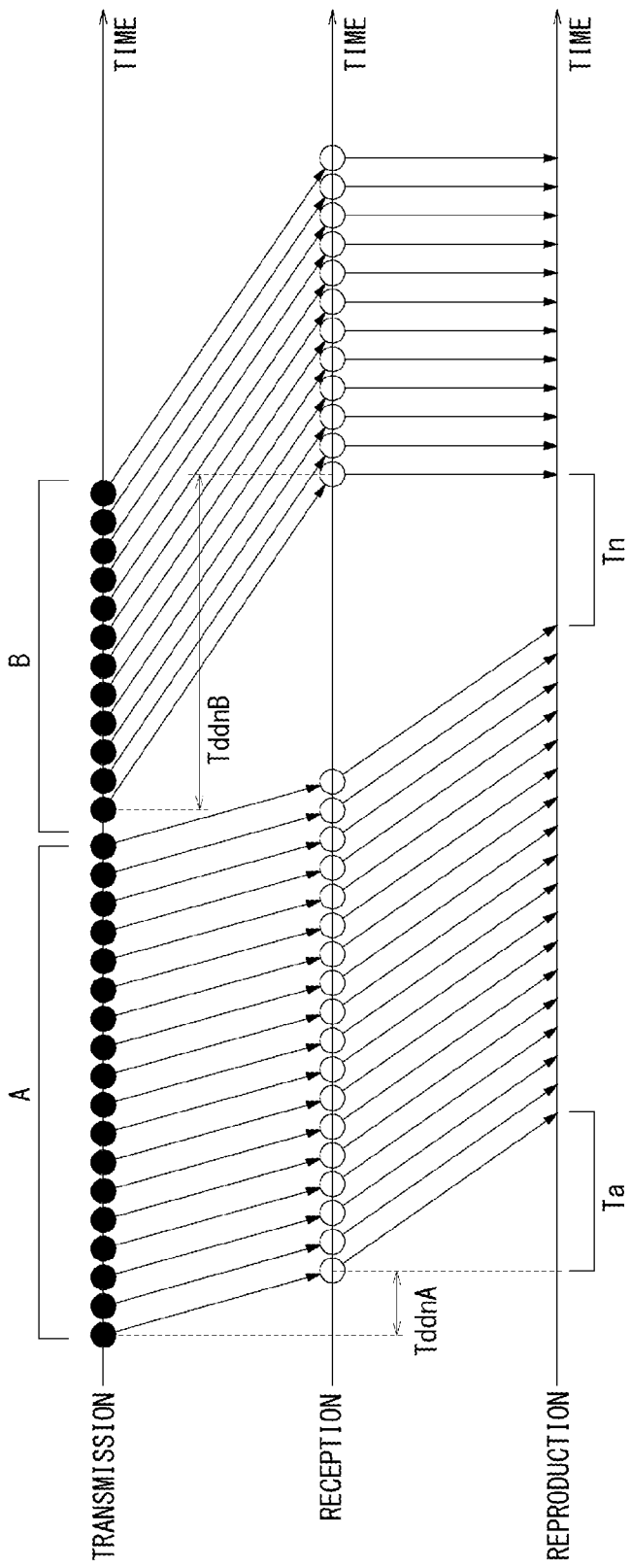
FIG. 13 is a diagram illustrating flows of packets by the control method shown in FIG. 12.
Figure 14:
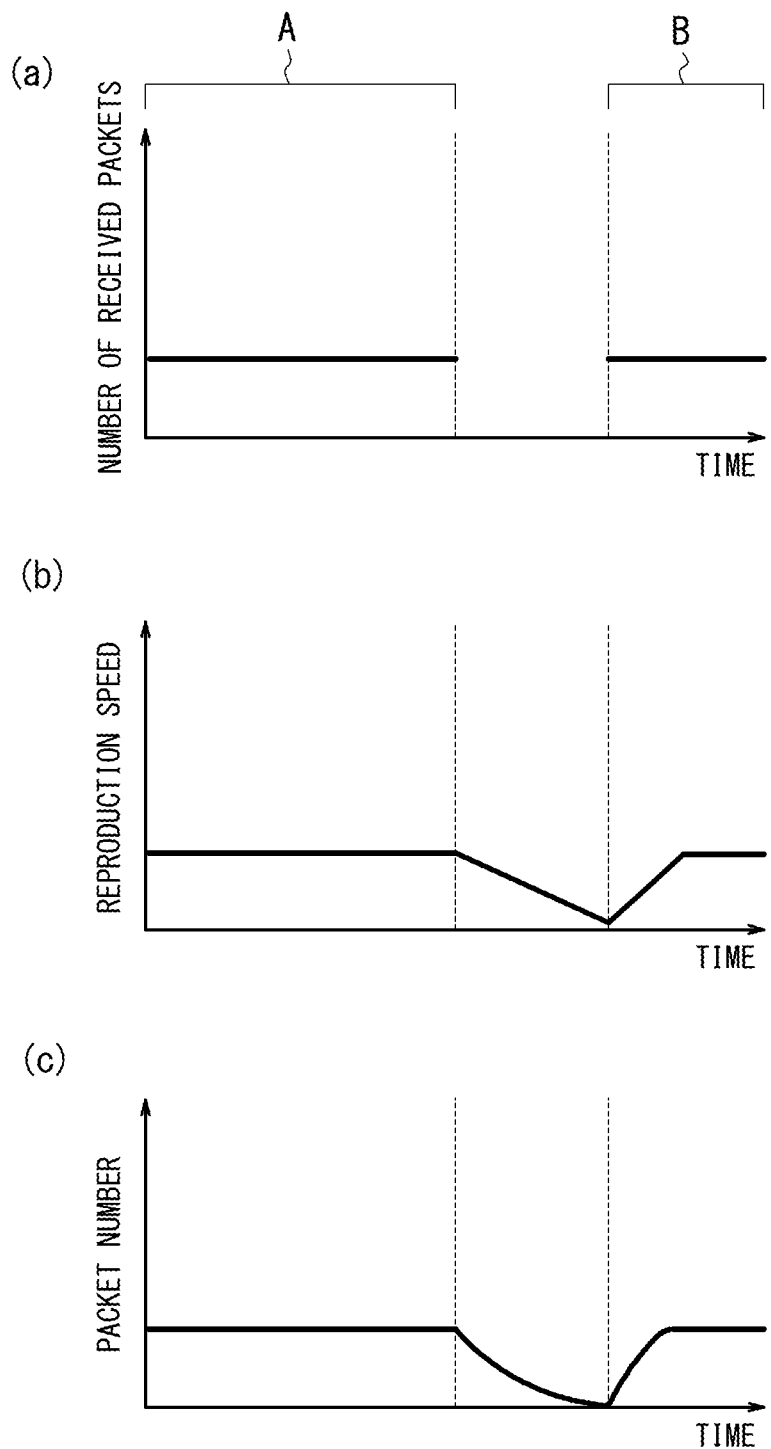
FIG. 14 is diagrams illustrating another example of the conventional control method of the jitter buffer.
Figure 15:
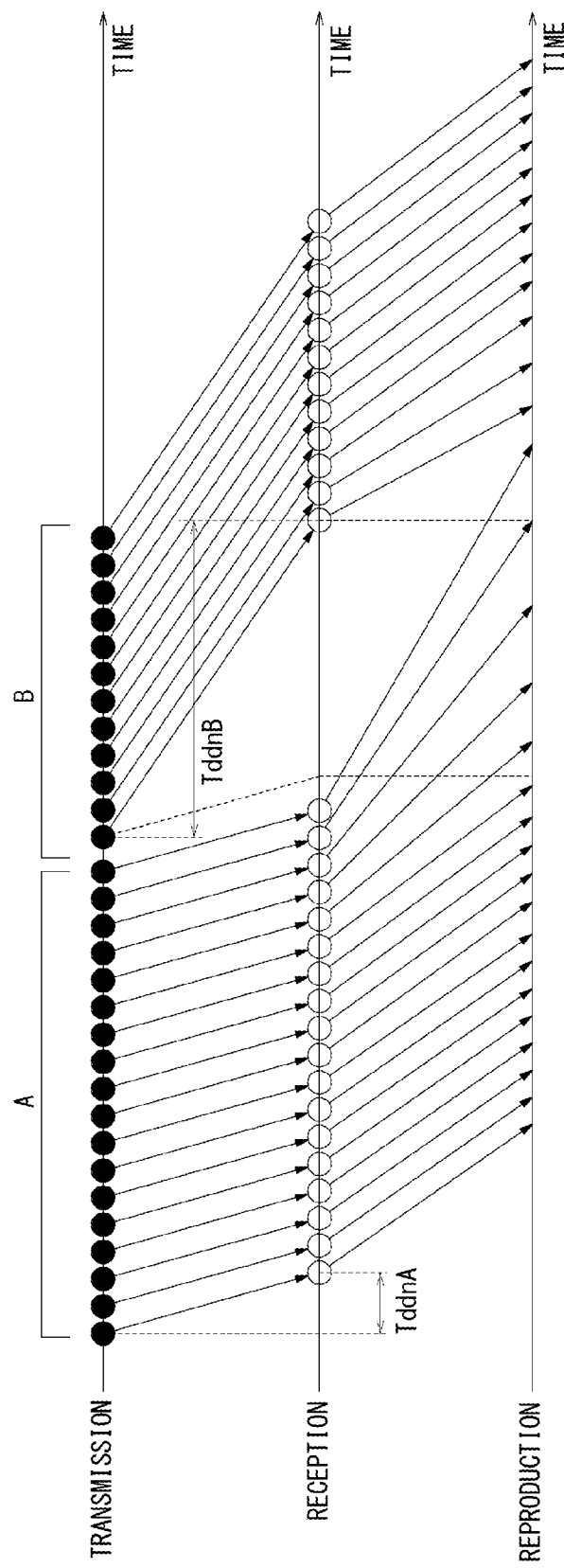
FIG. 15 is a diagram illustrating flows of packets by the control method shown in FIG. 14.

According to the control method shown in FIG. 10 and FIG. 11, since the handover preparation time T1 before handover, the downlink absolute delay time Tddn1 of the first wireless communication network 15 of the handover source and the downlink absolute delay time Tddn2 of the second wireless communication network 16 of the handover destination are obtained in advance if the handover is determined, when Tddn1<Tddn2 is satisfied, it is possible to know how long after determination of the handover schedule and for how long the packet will not arrive. Accordingly, a difference from the standard reproduction speed V1 can be reduced in comparison with the conventional methods shown in FIG. 12 and FIG. 14, as it is possible to control the reproduction speed V to absorb the delay time difference T2(T2=Tddn2−Tddn1) between the first wireless communication network 15 and the second wireless communication network 16 taking a long time from determining to start the handover preparation, so as to reproduce the packets received from the first wireless communication network 15 of the handover source even while the packets are not arriving.

Moreover, according to the present embodiment shown in FIG. 10, even before the handover schedule is determined, the upper limit of accumulation of the jitter buffer 47 is changed based on the radio state of the first wireless communication network 15 being used and the reproduction speed is controlled based on such change in the upper limit of accumulation. Therefore, if a period after the handover schedule is determined and before handover is actually performed is short, it is possible to reproduce the packets at a reproduction speed close to the standard reproduction speed, by more reducing a difference from the standard reproduction speed than the case shown in FIG. 11. Thereby, it is possible to reduce influence of jitter on reproduced voice caused by handover even more and to prevent generation of silence even if jitter is increased more than expected because of deterioration of the radio state. Therefore, it is possible to perform handover from the wireless communication network 15 to the second wireless communication network 16 without deteriorating reproduction quality and real-time property.

It is to be understood that the present invention is not limited to the above embodiment but may be modified or varied in a multiple of manners. For example, the present invention is applicable not only when executing the VoIP application but also when executing an application for real-time communication such as for streaming and reproducing multimedia data such as images and music. In such a case, the execution unit of the application may be constituted of a multimedia function unit having a similar function to control the jitter buffer, instead of the telephone function unit. Moreover, the present invention is applicable not only to handover between the wireless LAN and cdma2000 1xEV-DO but also to handover between arbitrary different wireless communication networks such as, for example, PDC (Personal Digital Cellular), W-CDMA (Wideband CDMA), PHS (Personal Handy-phone System), Bluetooth, WiMAX, LTE (Long Term Evolution), UMB (Ultra Mobile Broadband), IMT-Advanced, and the like.

The invention claimed is:

1. A wireless communication apparatus comprising:
a wireless communication unit configured to perform a wireless communication by connecting to a first wireless communication network and a second wireless communication network different from the first wireless communication network;
an execution unit having a jitter buffer and a jitter buffer monitoring unit configured to monitor a data amount in the jitter buffer, and configured to execute an application for real-time communication via the wireless communication unit;
a communication quality obtaining unit configured to obtain a communication quality of a wireless link in the first wireless communication network during execution of the application by connecting to the first wireless communication network;
a changing unit configured to change an upper limit of accumulation of the jitter buffer based on the communication quality obtained by the communication quality obtaining unit;
a control unit configured to control a reproduction speed of the application by the execution unit based on a change in the upper limit of accumulation of the jitter buffer by the changing unit;
a determination unit configured to determine whether to start handover preparation from the first wireless communication network to the second wireless communication network based on the communication quality obtained by the communication quality obtaining unit;
an estimation unit, when the determination unit determines to start handover preparation during execution of the application, configured to estimate a handover preparation time before starting handover based on the communication quality obtained by the communication quality obtaining unit; and
a measuring unit configured to measure a delay time of each of the first wireless communication network and the second wireless communication network, wherein the control unit, if the determination unit determines to start handover preparation, controls the reproduction speed of the application by the execution unit to be slowed down based on the handover preparation time estimated by the estimation unit, the delay time of each of the first wireless communication network and the second wireless communication network measured by the measuring unit, and the data amount in the jitter buffer monitored by the jitter buffer monitoring unit at a time when the determination unit determines to start handover preparation.

2. The wireless communication apparatus according to claim 1, wherein the control unit compares the delay time of the first wireless communication network and the delay time of the second wireless communication network when the determination unit determines to start handover preparation and, if the delay time of the second wireless communication network is longer than the delay time of the first wireless communication network by a predetermined time or longer, slows down the reproduction speed of the application by the execution unit.

3. The wireless communication apparatus according to claim 2, wherein the control unit, if the determination unit determines to start handover preparation, slows down the reproduction speed of the application by the execution unit such that the data amount in the jitter buffer meets a predetermined amount corresponding to a standard reproduction speed of the application at a time to start receiving data from the second wireless communication network.

4. The wireless communication apparatus according to claim 3, wherein the control unit returns the reproduction speed of the application to the standard reproduction speed after completing handover to the second wireless communication network.

5. The wireless communication apparatus according to claim 1, wherein the changing unit has a plurality of different changing thresholds for changing the upper limit of accumulation of the jitter buffer and changes the upper limit of accumulation of the jitter buffer to be more increased as the communication quality from the communication quality obtaining unit becomes closer to a handover schedule determination threshold of the first wireless communication network by the determination unit, based on a comparison of the communication quality from the communication quality obtaining unit and the plurality of changing thresholds.

6. The wireless communication apparatus according to claim 5, wherein the control unit controls the reproduction speed of the application, based on a comparison of the upper limit of accumulation of the jitter buffer set by the changing unit and the data amount in the jitter buffer monitored by the jitter buffer monitoring unit, such that the reproduction speed of the application is set to be the standard reproduction speed if the data amount is equal to the upper limit of the accumulation, to be a first reproduction speed slower than the standard reproduction speed if the data amount is smaller than the upper limit of the accumulation, and to be a second reproduction speed faster than the standard reproduction speed if the data amount exceeds the upper limit of accumulation.

7. The wireless communication apparatus according to claim 6, wherein an increased speed amount of the second reproduction speed to the standard reproduction speed is smaller than a decreased speed amount of the first reproduction speed to the standard reproduction speed.

8. The wireless communication apparatus according to claim 5, wherein the changing unit has, for the same upper limit of accumulation of the jitter buffer, an increasing changing threshold to be applied if the communication quality from the communication quality obtaining unit is lower than the increasing changing threshold, and a decreasing changing threshold to be applied if the communication quality from the communication quality obtaining unit exceeds the decreasing changing threshold, wherein the decreasing changing threshold is lower than the increasing changing threshold.

9. The wireless communication apparatus according to claim 6, wherein the changing unit has, for the same upper limit of accumulation of the jitter buffer, an increasing changing threshold to be applied if the communication quality from the communication quality obtaining unit is lower than the increasing changing threshold, and a decreasing changing threshold to be applied if the communication quality from the communication quality obtaining unit exceeds the decreasing changing threshold, wherein the decreasing changing threshold is lower than the increasing changing threshold.

10. The wireless communication apparatus according to claim 7, wherein the changing unit has, for the same upper limit of accumulation of the jitter buffer, an increasing changing threshold to be applied if the communication quality from the communication quality obtaining unit is lower than the increasing changing threshold, and a decreasing changing threshold to be applied if the communication quality from the communication quality obtaining unit exceeds the decreasing changing threshold, wherein the decreasing changing threshold is lower than the increasing changing threshold.

* * * * *